(12) United States Patent
Shi et al.

(10) Patent No.: US 10,849,144 B2
(45) Date of Patent: Nov. 24, 2020

(54) METHOD AND APPARATUS FOR DETERMINING THE SCHEDULING GAP

(71) Applicant: ZTE CORPORATION, Guangdong (CN)

(72) Inventors: Jing Shi, Guangdong (CN); Bo Dai, Guangdong (CN); Yifei Yuan, Guangdong (CN); Huiying Fang, Guangdong (CN); Shuqiang Xia, Guangdong (CN); Shupeng Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 79 days.

(21) Appl. No.: 16/074,061

(22) PCT Filed: Dec. 21, 2016

(86) PCT No.: PCT/CN2016/111357
§ 371 (c)(1),
(2) Date: Jul. 30, 2018

(87) PCT Pub. No.: WO2017/133339
PCT Pub. Date: Aug. 10, 2017

(65) Prior Publication Data
US 2019/0045525 A1 Feb. 7, 2019

(51) Int. Cl.
*H04W 4/70* (2018.01)
*H04W 72/12* (2009.01)
(Continued)

(52) U.S. Cl.
CPC ....... *H04W 72/1257* (2013.01); *H04L 5/0044* (2013.01); *H04L 5/0053* (2013.01);
(Continued)

(58) Field of Classification Search
CPC ..... H04L 1/1845; H04L 1/1858; H04L 1/189; H04L 5/0044; H04L 5/0053;
(Continued)

(56) References Cited

U.S. PATENT DOCUMENTS

| 10,057,897 B2 | 8/2018 | You et al. |
| 2016/0157229 A1 | 6/2016 | Zhuang et al. |

(Continued)

FOREIGN PATENT DOCUMENTS

| CN | 104780549 A | 7/2015 |
| CN | 104823396 A | 8/2015 |
| CN | 104871469 A | 8/2015 |

OTHER PUBLICATIONS

Nokia Networks, "Timing Relationships for MTC", 3GPP TSG-RAN WG1 Meeting #82bis, R1-155131, Malmo, Sweden, Oct. 5-9, 2015, 6 pages.
(Continued)

*Primary Examiner* — Harun Chowdhury
(74) *Attorney, Agent, or Firm* — Duane Morris LLP

(57) ABSTRACT

The present invention provides a method and apparatus for determining a scheduling gap, wherein, the method comprises: demodulating the NarrowBand Physical Downlink Control Channel in order to determine the initial subframe of the scheduled NarrowBand Physical Downlink Shared Channel (NB-PDSCH) or the NarrowBand Physical Uplink Shared Channel (NB-PUSCH), wherein, the basis for determining the initial subframe comprises at least one of the following: the final subframe of the NB-PDCCH, the final subframe in the search space where the NB-PDCCH is located, the resource allocation within the scheduling window, and the scheduling gap indication. The implementation of the present technical solutions solves the problem of how to determine the scheduling within the NarrowBand system,
(Continued)

thereby saving indication expenditure and improving resource usage efficiency.

12 Claims, 7 Drawing Sheets

(51) Int. Cl.
    *H04L 5/00*     (2006.01)
    *H04W 76/27*     (2018.01)
    *H04W 72/04*     (2009.01)

(52) U.S. Cl.
    CPC ............. *H04L 5/0094* (2013.01); *H04W 4/70* (2018.02); *H04W 72/042* (2013.01); *H04W 72/0446* (2013.01); *H04W 72/0493* (2013.01); *H04W 76/27* (2018.02); *H04L 5/0007* (2013.01)

(58) Field of Classification Search
    CPC .. H04L 5/0094; H04W 48/12; H04W 72/042; H04W 72/082; H04W 4/70; H04W 72/0493; H04W 72/1257

USPC .......................................... 370/252, 329, 336
See application file for complete search history.

(56) References Cited

U.S. PATENT DOCUMENTS

| | | |
|---|---|---|
| 2016/0338110 A1 | 11/2016 | Wang et al. |
| 2018/0098239 A1* | 4/2018 | You ....................... H04W 48/12 |
| 2018/0184434 A1* | 6/2018 | Blankenship ........... H04L 1/189 |

OTHER PUBLICATIONS

Nokia Networks, "Returning Gaps for MTC", 3GPP TSG-RAN WG1 Meeting #82, R1-153826, Beijing, China, Aug. 24-28, 2015, 5 pages.
International Search Report dated Mar. 1, 2017, in corresponding International Application No. PCT/CN2016/111357.
Mediateck Inc., "Discussion on timing relationship for (E) PDCCH and PDSCH", 3GPP TSG-RAN WG1 #75 R1-135427, Nov. 15, 2013, sections 1 and 2.2, 4 pages.

* cited by examiner

METHOD AND APPARATUS FOR DETERMINING THE SCHEDULING GAP

TECHNICAL FIELD

The present invention involves the field of Communications, specifically a method and apparatus for determining the scheduling gap.

BACKGROUND TECHNIQUES

Machine Type Communication (MTC), also known as Machine to Machine (M2M), and the NarrowBand Internet of Things (NB-IoT) are currently the main avenues of application for the Internet of Things. When compared with the Long-Term Evolution (LTE) system, the characteristics of this type of communications system are generally that its bandwidth is narrower (e.g. 1.4 MHz, 200 kHz, etc.), there is more user equipment (UE) (comprising traditional handheld terminals and machines, sensor terminals, etc.), and there are coverage enhancement requirements comprising coverage enhancements of 15 dB or 20 dB.

Currently, there are three working scenarios for the NB-IoT system (In-band within the LTE system, guard-band within the LTE system, and standalone). Such communication systems typically require the ability to work independently and the ability to coexist with the LTE system, wherein the downlink subframe gap and the transmission bandwidth of the NB-IoT are 15 kHz and 180 kHz, respectively, which are the same as the subcarrier gap and the bandwidth of one Physical Resource Block (PRB) of the LTE system, which facilitates the reuse of the related design of existing LTE systems within NB-IoT systems; when the GSM frequency spectrum reused by the NB-IoT system is adjacent to the frequency spectrum of the LTE system, mutual interference between the two systems is reduced.

Within the related art, the LTE system schedules the downlink data transmission and the uplink data transmission of the terminal using the Downlink grant (DL grant) and the Uplink grant (UL grant), respectively, wherein the DL grant and the UL grant are collectively called the Downlink Control Information (DCI), and uses the Physical Downlink Control Channel (PDCCH) or the Enhanced Physical Downlink Control Channel (EPDCCH) bearer; downlink data is carried on the Physical Downlink Shared Channel (PDSCH), and uplink data is carried on the Physical Uplink Shared Channel (PUSCH). In the LTE system, the PDDCH uses the resources of the first four Orthogonal Frequency Division Multiplexing (OFDM) symbols of the system bandwidth, and uses the Control Channel Element (CCE) as the basic aggregation resource granularity; the transmission mode uses the transmission diversity scheme. The EPDCCH uses the resources from a portion of the PRB in the system bandwidth, and uses the Enhanced Control Channel Element (ECEE) as the basic aggregation resource granularity; the transmission mode uses centralized transmission or distributed transmission.

Since the downlink control channel search space is located at the first four OFDM symbols in the system's bandwidth in the related art, the aggregation level used by the enhanced downlink control channel exists only within one subframe, and a portion of the PRB within the subframe forms a frequency-domain set of the search space. Therefore, for NB-IoT NarrowBand systems with only 1 PRB in the frequency domain, the control channel will occupy resources in one or multiple subframes. The uplink and downlink scheduled time gaps are all fixed scheduling gaps, but uplink traffic channels and downlink traffic channels in NarrowBand systems will occupy multiple subframes in the time-domain; when this happens using fixed scheduling gap will lead to the collision of the traffic channels of different terminals. How to determine the uplink scheduling and the downlink scheduling in the NarrowBand system the size of one PRB still lacks an effective solution.

In the related art, there is yet to be an effective solution for determining the scheduling timing in the NarrowBand system.

CONTENTS OF THE PRESENT DISCLOSURE

The embodiments of the present invention provide a method and apparatus for determining the scheduling gap, which at least solves the problem in the related art whereby the use of fixed scheduling gap leads to the collision of the traffic channels of different terminals.

One embodiment of the present invention provides a method for determining the scheduling gap, comprising: demodulating the NarrowBand Physical Downlink Control Channel (NB-PDCCH) in order to determine the initial subframe of a scheduled NarrowBand Downlink Shared Channel (NB-PDSCH) or the NarrowBand Physical Uplink Shared Channel (NB-PUSCH), wherein, the basis for determining the initial subframe comprises at least one of the following: the final subframe of the NB-PDCCH, the final subframe in the search space where the NB-PDCCH is located, the resource allocation within the scheduling window, and the scheduling gap indication.

Furthermore, when determining the initial subframe of the NB-PUSCH or the NB-PDSCH according to the final subframe of the PDCCH, a fixed scheduling gap is used.

Furthermore, when multiple NB-PDSCHs are supported in one Physical Resource Block (PRB) pair and the fixed scheduling gap is used to determine the initial subframe of the NB-PDSCH, Downlink Control Information (DCI) or an implicit determination method is used to indicate the position of the NB-PDSCH within one PRB.

Furthermore, when the initial subframe of the NB-PDSCH or the NB-PUSCH is determined based on the final subframe of the search space where the NB-PDCCH is located, a fixed scheduling gap or an indication based on the scheduling gap is used, wherein, the scheduling gap indication expresses the final subframe of the search space where the NB-PDCCH is located to the initial subframe of the NB-PUSCH or the NB-PDSCH.

Furthermore, when the initial subframe of the NB-PUSCH or the NB-PDSCH is determined based on the final subframe of the NB-PDCCH and the scheduling gap indication, the set of values for the scheduling gap used is a finite value, the element values in the value set are continuous or non-continuous, the value set is fixed or configured by a System Information Block (SIB) or a Radio Resource Control (RRC), wherein, the scheduling gap indication shows the final subframe of the NB-PDCCH to the initial subframe of the NB-PDSCH or the NB-PUSCH.

Furthermore, the scheduling gap indication comprises one of the following modes: single indication, and two-level indication; wherein, the single indication uses a single parameter to indicate a scheduling gap; the first indication of the the two-level indication is a single indication parameter, and the second indication of the two-level indication indicates the offset value based on the first indication; the value range for the offset value is a finite value, and is fixed or configured by the SIB or the RRC.

Furthermore, the value set is implicitly determined to be a different value by at least one of the following: repetitions indicated in the DCI, the search space type, and the coverage type; the value set comprises at least one of the following: the single indication, the first indication of the two-level indication, and the second indication of the two-level indication; wherein, the unit corresponding to the value of the value set is a resource unit of a service channel, a physical subframe, an available subframe, a radio frame, or a transmission time gap, wherein, the number of repeat indications in the DCI comprises at least one of the following: NP-PDSCH repetitions, NB-PUSCH repetitions, NB-PDCCH repetitions.

Furthermore, when the value set is implicitly determined to be different values based on the number of maximum repetition (Rmax) configured by high-layer signaling or the number of repetitions indicated in the DCI, the different values uniformly use multiples of Rmax/i, wherein the scheduling gap is represented by the same common factor, i is an integer greater than 0, and the different values comprise at least one of the following modes: using a multiple of Rmax/i; using at least two multiples of Rmax/i.

Furthermore, on the basis of a default or configured threshold of Rmax=C, when Rmax is greater than or equal to C, and Rmax is lesser than C, respectively, two sets of values of scheduling time gaps are respectively used.

Furthermore, the value of the value set comprises at least one of the following: using the same multiple of Rmax/i, and using different common factors; using different multiples of Rmax/i, and using the same common factors; one group does not use multiples of Rmax/i, and another group uses multiples of Rmax/i.

Furthermore, the value of the element in the value set comprises at least one of the following: $2^x$, wherein, x is at least one of the following $\{0, 1, 2, 3, \ldots, 20\}$; an integer multiple of the radio frame length, such as $\{10, 20, 30, 40, \ldots\}$; an integer multiple of the number of subframes occupied by the transport block; if, for example, a transport block occupies at most 6 subframes, the value element can be $\{6, 12, 18, 24, \ldots\}$; an integer multiple of the control channel occupied subframes; $k \times 2^x$, wherein k is a positive integer greater than, or greater than or equal to, 0.

Furthermore, the method for determining the maximum value of the elements in the value set comprises at least one of the following: the length of the resource allocation cycle, the scheduling window, or the scheduling cycle; a unique value that is fixed or configured by the base station; respectively determined based on differing coverage rankings; determined based on at least one coverage ranking; determined based on the uplink single carrier transmission; determined based on the uplink subcarrier gap.

Furthermore, when the initial subframe of the NB-PDSCH or the NB-PUSCH is determined based on the resource allocation within the scheduling window, the value of the scheduling gap is any value lesser than the window length of the scheduling window; the resource allocation within the scheduling window uses a continuous resource allocation that does not exceed X PRBs or subframes, wherein, the value of X is lesser than the scheduling window length, the scheduling gap is from the final subframe of the NB-PDCCH to the initial subframe of the NB-PDSCH or the NB-PUSCH.

Furthermore, when the initial subframe of the NB-PDSCH or the NB-PUSCH is determined based on the resource allocation within the scheduling window, it is further jointly determined based on the offset value dynamically indicated by the DCI; the subframe resources occupied by the NB-PDSCH or the NB-PUSCH span scheduling windows or are only within the scheduling window.

Furthermore, when the coverage enhancement scenario repeatedly transmits R times using the resources determined by resource allocation, the method contains at least one of the following modes: based on the resource allocation within the scheduling window, transmission is repeated R times between the scheduling windows; based on the resource allocation within the scheduling window, transmission is repeated Rin times within the scheduling window, and transmitted Rout times between scheduling windows; wherein, at least one of R, Rin, and Rout are notified by RRC, SIB, or DCI; R, Rin, and Rout are all positive integers.

Furthermore, when the NB-PDCCH repeats transmission R times, at least one of the following methods is included: when R is not greater than or lesser than Rx, transmission is repeated R times within the transmission window; when R is greater than Rx, transmission is repeated R times between transmission windows; when R is greater than Rx, transmission is repeated Rin times within the scheduling window, and is repeated Rout times between scheduling windows, wherein at least one of R, Rin, and Rout are notified by RRC, SIB, or DCI; Rx, R, Rin, and Rout are all positive integers.

Furthermore, value determination methods for R, Rin, Rout, and Rx comprise at least one of the following: at least one of R, Rin, Rout, and Rx has a value of $2^x$, wherein, x is at least one of the following: $\{0, 1, 2, 3, \ldots, 20\}$; R=Rin×Rout; at least one of R, Rin, and Rout is determined to have a different fixed value based on differing coverage rankings, or the base station configures one or a set of values; when configured as a set of values, the specific values are notified in the DCI; Rx and/or Rin are determined by at least one of the following: coverage ranking, scheduling window length, and the number of maximum repetition.

Furthermore, when the NB-PDSCH occupies consecutive subframes in the time domain, the method for determining the number of consecutive subframes occupied comprises at least one of the following: joint coding with the initial subframe within a predetermined indication range, using continuous resource allocation; separate indications within a limited set of values, wherein the elements within the limited set of values are continuous values or non-continuous values.

Furthermore, the mode for resource occupation of the NarrowBand Control Channel Element (NB-CCE) used by the NB-PDCCH in one PRB pair or one subframe comprises one of the following: occupying the same 6 continuous or non-continuous subcarriers on all the Orthogonal Frequency Division Multiplexing (OFDM) symbols; occupying 6 different non-continuous subcarriers on different OFDM symbols; occupying 6 different continuous subcarriers on different OFDM symbols.

Furthermore, the search space where the NB-PDCCH is located comprises one or multiple aggregation levels, and the method for determining the number of candidate sets corresponding to different aggregation levels at different repetition frequencies comprises at least one of the following: when different aggregation levels are at different repetition frequencies, the number of candidate sets is one; when different aggregation levels are at different repetition frequencies, the number of candidate sets varies; the number of candidate sets corresponding to an aggregation level of 1 is greater than 1; the number of candidate sets corresponding to the number of non-maximum repetition being greater than 1.

When the repetitions is greater than, or greater than or equal to, the threshold value Rx, the number of candidate sets is equal to 1; when the repetitions is lesser than, or lesser than or equal to, Rx, the number of candidate sets is greater than 1.

Furthermore, the length of the scheduling window is determined by at least one of the following: the resource unit length, the scheduling gap, and the non-continuous transmission gap. The length of the scheduling window is configured by the eNB through SIB or RRC, or is a fixed length. Determination methods comprise at least one of the following: the length is greater than at least one of the following: the resource unit length, the scheduling gap, and the non-continuous transmission gap; the length is an integer multiple of at least one of the following: the resource element length, the scheduling gap, and the non-continuous transmission gap; the length satisfies $2^x$, wherein, x is at least one of the following: $\{1, 2, 3, \ldots, 20\}$; the length satisfies an integer multiple of the radio frame length.

Furthermore, the uplink scheduling window length and the downlink scheduling window length are the same, fixed or uniformly configured; or, the uplink scheduling window length and the downlink scheduling window length are independently configured or take a different fixed value.

Furthermore, the initial subframe of the search space where the NB-PDCCH is located is determined according to at least one of the following: the scheduling window length, the offset value, the number of maximum repetition (Rmax), and the resource allocation cycle.

Furthermore, when the initial subframe is determined based on the cycle (T) and offset value, the position of the initial subframe, the position of the initial subframe plus the offset value, or the position of the initial subframe minus the offset value is an integer multiple of T, wherein, the offset value is not greater than the length of the scheduling window, wherein, the cycle (T) is the scheduling window length, the scheduling cycle, or the resource allocation cycle, or an integer multiple of the resource allocation cycle, the scheduling cycle, or the scheduling window length.

Furthermore, when the initial subframe is determined based on the number of maximum repetition, the method comprises at least one of the following: the initial subframe is located at the first subframe of the cycle, wherein, the cycle is an integer multiple of the Rmax, wherein, the value of the integer multiple is a continuous value or non-continuous value; the continuous value is, for example: $\{1, 2, 3, 4 \ldots \}$; the non-continuous value is, for example: $\{1, 2, 4, 8 \ldots \}$; the initial subframe is located at the first subframe plus the offset value, wherein, the offset value is the integer multiple of Rmax divided by i; the cycle is an integer multiple of the Rmax, wherein, the value of the integer multiple is a continuous value or a non-continuous value; the continuous value is, for example: $\{1, 2, 3, 4 \ldots \}$, the non-continuous value is, for example: $\{1, 2, 4, 8 \ldots \}$.

Furthermore, the cycle is a set of values determined by an integer multiple or a non-integer multiple of the Rmax, or the cycle is a set of values determined by an integer multiple or a non-integer multiple of the Rmax plus a constant (m), comprising at least one of the following: the value set comprises positive integers greater than or equal to 10; the value set does not contain 1; the value set contains non-positive integers greater than 1 and lesser than 5; using the basis of threshold Rmax=D to distinguish different value sets, wherein, D is a fixed constant or a constant configured by high-layer signaling.

Furthermore, the value sets corresponding to the UE-specific search space (USS) and the common search space (CSS) are different; the value sets comprise at least one of the following: the CSS value set does not contain non-positive integers; the minimum value of the CSS value set is greater than the minimum value of the USS value set; the maximum value of the CSS value set is greater than the maximum value of the USS value set.

Furthermore, when the NB-PDCCH, the NB-PDSCH, or the NB-PUSCH has a repeat transmission, the base station notifies whether the repeat transmission is a continuous transmission or an gap/non-continuous transmission through the SIB, comprising at least one of the following: configure whether or not to execute non-continuous transmission, and the non-continuous transmission mode is implicitly determined; configure the number of non-continuous transmission gaps, and the gap location is implicitly determined; configure a preset cycle, and an gap position within the cycle; configure a preset cycle, and the cycle size is equal to the gap duration; a fixed cycle and a fixed gap duration, with a fixed value that is a power of 2, an integer multiple of the radio frame, or an integer multiple of 8.

Furthermore, when the gap position within the cycle and the cycle are preset, the unit for the cycle and/or the gap is a multiple of subframes or Rmax/i, wherein, the size of the cycle and the gap are respectively configured or configured through joint coding, wherein, i is an integer from 1 to 8.

Furthermore, the method for determining the gap duration within the cycle and the cycle based on the threshold value comprises at least one of the following: the maximum value of the cycle is lesser than, or lesser than or equal to, the threshold value; the maximum value of the gap duration is lesser than the cycle value; the maximum value of the gap duration is lesser than the threshold value, wherein, the threshold value is a fixed value or a value configured by high-layer signaling.

Another embodiment of the present invention further provides a apparatus for determining the scheduling of the scheduling gap, comprising: the determination module, set up to demodulate the NarrowBand Physical Downlink Control Channel (NB-PDCCH) in order to determine the initial subframe of a scheduled NarrowBand Downlink Shared Channel (NB-PDSCH) or the NarrowBand Physical Uplink Shared Channel (NB-PUSCH), wherein, the basis for determining the initial subframe comprises at least one of the following: the final subframe of the NB-PDCCH, the final subframe in the search space where the NB-PDCCH is located, the resource allocation within the scheduling window, and the scheduling gap indication.

The embodiments of the present invention further provide a computer storage medium, which can store computer-executable instructions, wherein the computer-executable instructions are used for carrying out the methods for determining the scheduling gap of the above embodiments.

With the implementation of the embodiments of the present invention, the NarrowBand Physical Downlink Control Channel (NB-PDCCH) is demodulated in order to determine the initial subframe of the scheduled NarrowBand Downlink Shared Channel (NB-PDSCH) or the NarrowBand Physical Uplink Shared Channel (NB-PUSCH), wherein, the basis for determining the initial subframe comprises at least one of the following: the final subframe of the NB-PDCCH, the final subframe in the search space where the NB-PDCCH is located, the resource allocation within the scheduling window, and the scheduling gap indication, thereby solving both the problem of how to determine scheduling in the NarrowBand system, which saves indication expenditure and uses resources more efficiently, and the problem of the resource waste caused by resource inequalities resulting from fixed time gaps, thereby solving the problem of continuous transmission congestion.

BRIEF DESCRIPTIONS OF THE DRAWINGS

The accompanying drawings are provided to further the understanding of the present invention, and constitute one component of the present application; the illustrative embodiments of the present invention and their explanations are meant to explain the present invention, and do not serve to limit its claims. The drawings:

DETAILED DESCRIPTION OF THE EMBODIMENTS

The present invention will be described in detail with reference to the accompanying drawings and embodiments. It should be noted that the embodiments of the present application and their characteristics can be combined in a non-conflicting manner.

It should also be noted that the descriptions, drawings, and Claims of the present invention use the terms "first" and "second" only to distinguish like objects, and do not describe specific sequences or orders.

Figure 1:
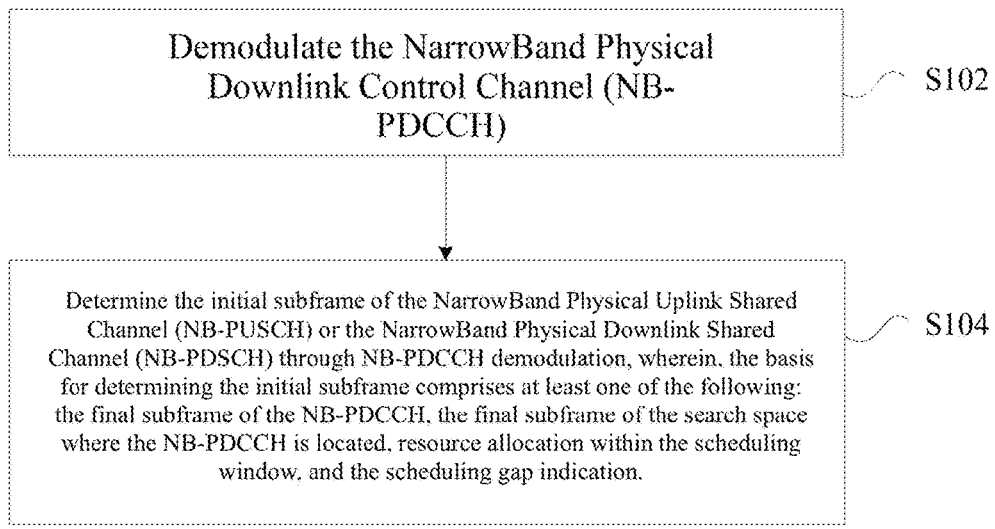
FIG. 1 is a flowchart of a method for determining the scheduling gap based on the preferred embodiments of the present invention.

The present embodiments provide a method for determining the scheduling gap; FIG. 1 is a flowchart of a method for determining the scheduling gap of the present embodiments. As FIG. 1 shows, the process comprises the following steps:

Step S102, demodulate the NarrowBand Physical Downlink Control Channel (NB-PDCCH);

Step S104, determine the initial subframe of the scheduled NarrowBand Physical Uplink Shared Channel (NB-PUSCH) or the NarrowBand Physical Downlink Shared Channel (NB-PDSCH) through NB-PDCCH demodulation, wherein, the basis for determining the initial subframe comprises at least one of the following: the final subframe of the NB-PDCCH, the final subframe of the search space where the NB-PDCCH is located, resource allocation within the scheduling window, and the scheduling gap indication.

The implementation of the above steps, whereby the initial subframe of the NarrowBand Physical Uplink Shared Channel (NB-PUSCH) or the NarrowBand (Physical) Downlink Shared Channel (NB-PDSCH) is determined through NB-PDCCH demodulation, solves the problem of how to schedule the scheduling gap in the NarrowBand system, saving indication expenditure and increasing the efficiency of resource usage.

Within the embodiments of the present invention, when determining the initial subframe of the NB-PUSCH or the NB-PDSCH based on the final subframe of the NB-PDCCH, a fixed scheduling gap is used.

Within the embodiments of the present invention, when one Physical Resource Block (PRB) pair supports multiple NB-PDSCH, and the fixed scheduling gap is used to determine the initial subframe of the NB-PDSCH, indicate the NB-PDSCH position within a PRB through Downlink Control Information (DCI) or the implicit determination mode.

Within the embodiments of the present invention, when the initial subframe of the NB-PUSCH or the NB-PDSCH is determined according to the final subframe of the search space where the NB-PDCCH is located, a fixed scheduling gap or an indication based on the scheduling gap is used, wherein, the scheduling gap indication expresses the final subframe of the search space where the NB-PDCCH is located to the initial subframe of the NB-PUSCH or the NB-PDSCH.

Within the embodiments of the present invention, when the initial subframe of the NB-PUSCH or the NB-PDSCH is determined according to the final subframe of the NB-PDCCH and the scheduling gap indication, the set of values for the scheduling gap used is a finite value, the element values of the value set are continuous or non-continuous values; the value set is fixed or configured by the Radio Resource Control (RRC) or the System Information Block (SIB), wherein, the scheduling gap indication expresses the final subframe of the NB-PDCCH to the initial subframe of the NB-PUSCH or the NB-PDSCH.

Within the embodiments of the present invention, the scheduling gap indication comprises one of the following modes: single indication, and two-level indication; wherein, the single indication uses a single parameter to indicate the scheduling gap, the first-level indication of the two-level indication is a single indication parameter; the second-level indication of the two-level indication indicates the offset value based on the first-level indication; the value set is fixed or configured by the RRC or the SIB.

Within the embodiments of the present invention, the value set is implicitly determined to be a different value by at least one of the following: the repetitions indicated in the DCI, the search space type, and the coverage type, wherein the value set comprises at least one of the following: single indication, two-level indication, the first-level indication of the two-level indication, the second-level indication of the two-level indication; wherein, the unit corresponding to the values of the value set is the resource unit of the service channel, the physical subframe, the available subframe, the radio subframe, or the transmission scheduling gap, wherein, the repetitions indicated in the DCI comprise at least one of the following: NP-PDSCH repetitions, NB-PUSCH repetitions, NB-PDCCH repetitions.

Within the embodiments of the present invention, when the data set is implicitly determined to be different values based on the repetitions indicated in the DCI or the number of maximum repetition (Rmax) configured by high-level signaling, the different values uniformly use Rmax/i multiples, wherein, the scheduling gaps use the same common factors, i is a positive integer greater than 0, and the different values comprise at least one of the following:

using a multiple of Rmax/i; for example, only using Rmax/8 as multiples, the same common factor ki={k1, k2, k3, k4, k5, k6, k7, k8}, indicated using 3 bits, expressed as ki*Rmax/8 or ki*Rmax/8+4. k1~k8 can be both continuous or non-continuous values, and can also be determined by single indication or two-level indication. Optimally, k1~k8 are {0, 1, 2, 3, 4, 5, 6, 7}; or {0, 1, 2, 4, 6, 8, 12, 16}; or {0, 1, 2, 4, 6, 8, 10, 12}; or {0, 1, 2, 4, 8, 12, 16, 24}.

using at least two multiples of Rmax/i. For example, as a multiple of different levels of two-level indication, respectively, such as {0, 1, 2, 3*Rmax/4}+{0, Rmax/8}={0, 1, 2, 3, 4, 5, 8, 9}Rmax/8; {0, 1, 2, 3*Rmax/2}+{0, Rmax/8}={0, 1, 4, 5, 8, 9, 12, 13}Rmax/8; {k1, k2, k3, k4}+{0, ki/2}, wherein when k4=Rmax, k3=k4/2, k2=k4/4, k1=k4/8,={1, 3/2, 2, 3, 4, 6, 8, 12}Rmax/8; {k1, k2, k3, k4}+{0, ki/2}, wherein when k4=8*Rmax/8, k3=k4/2, k2=k4/4, k1=0,={0, 1, 2, 3, 4, 6, 8, 12}Rmax/8.

Within the embodiments of the present invention, on the basis of a default or configured threshold of Rmax=C, when Rmax is greater than or equal to C, and Rmax is lesser than C, respectively, value sets from the two sets of scheduling gaps are respectively used, wherein the values of the value set comprise at least one of the following:

using the same multiple of Rmax/i, and using different common factors; for example, using identical Rmax/8 as multiples, the two groups of value sets are (k1~k7)*Rmax/8; (y1~y7)*Rmax/8. For example: one group is {0, 1, 2, 3, 4, 5, 6, 7}, and another group is {0, 2, 4, 6, 8, 12, 16, 24}, wherein C is a preset value.

using different multiples of Rmax/i, and using the same common factors. For example, using identical common factors (k1~k7), and using different multiples of Rmax/i, such as (k1~k7)*Rmax/8; (k1~k7)*Rmax/4.

One group does not use multiples of Rmax/i, and another group uses multiples of Rmax/i. For example, one group has a value of (k1~k7)*D, where D is a constant; another group has a value of (y1~y7)*Rmax/8. For example, using the identical common factor (k1~k7), the relatively larger Rmax uses absolute value, and the relatively smaller Rmax uses Rmax/8; one group has a value of (k1~k7)*D; another group has a value of (k1~k7)*Rmax/8.

Wherein, if Rmax/8 is lesser than 1, it is uniformly rounded up to 1.

Whether it is the single indication or any level of the two-level indication, the corresponding value set is configured by the SIB or the RRC, or is implicitly determined based one at least one of the following: the NB-PDSCH, the NB-PUSCH, or the NB-PDCCH indicated by the DCI. For DCI transmitted in the CSS, for example, the value set is configured by the SIB; for DCI transmitted in the USS, the value set is configured by the RRC. The element of the value set can be 2, 4, 6 , 8, 10, or 16, etc. For example, the first-level of the two-level indication is 1 bit indicating two values {k1, k2}, or 2 bit indicating 4 values {k1, k2, k3, k4}, or 3 bit indicating 8 values {k1, k2, k3, k4, k5, k6, k7, k8}, wherein the largest k value (kmax) is configured by the eNB, and the remaining is implicitly obtained, such as with 4 values, k4=kmax is configured by the eNB, k3=k4/2, k2=k4/4, k1=k4/8, and the possible set of values for kmax is {4, 8, 16, 32, 64, 128, 256} or their subframes.

When configured through the RRC, the kmax value is configured based on the terminal coverage type, such as with normal coverage configuring the kmax as 32, and with enhanced coverage configuring the kmax as 256; or the kmax is implicitly determined based on at least one of the following: NB-PDSCH, NB-PUSCH, or NB-PDCCH indicated by the DCI, without the need for SIB or RRC configuration, such as when determining the downlink scheduling gap, the DCI indicated NB-PDSCH repetitions is R=256, and the kmax=R, R/2, R/4, or R/8, etc. When the second-level indication is a fixed value, such as 1 bit indicating {0, 1}, {0, 2}, or {0, 4}, 2 bit indicating {0, 1, 2, 3}, {0, 1, 2, 4}, or {0, 2, 4, 6}, 3 bit indicating {0, 1, 2, 3, 4, 5, 6, 7}, or the second-level indication is a configured value set, with 2 bit, for example, indicating {0, 1x, 2x, 3x}, x is the minimum k value (kmin) of the first-level indication, or x is kmin/4, kmin/2, kmax/16, or kmax/32.

With two-level indication, the first-level indication is added to the second-level indication to obtain the scheduling gap, or the first-level indication is multiplied with the second-level indication to obtain the scheduling gap, or the first-level indication determines the numerical value, which is combined with the resource unit length determined by the second-level indication to obtain the scheduling gap. The value set determined by single indication can also be regarded as undergoing two levels of indication and calculated in the above manner.

One of the above combination selections is listed below: for example, when configuring or implicitly obtaining k4=32, with the second-level indication {0, 1, 2, 3}, summation of the two levels is adopted, and the scheduling timing value set is 4 bit indicating one of the set {4, 5, 6, 7, 8, 9, 10, 11, 16, 17, 18, 19, 32, 33, 34, 35}. The remaining combinations are similar, and will not be discussed further here.

Alternatively, the second-level indication makes a determination based on the first-level indication, that is, second-level indication value sets corresponding to different first-level indication values are not alike. Optimally, the granularity of second-level indications corresponding to relatively large level-one indications is also relatively large. Using 2 bit first-level indications and 2 bit second-level indications as an example, if the first-level indication is ki (i=1, 2, 3, 4), the second-level indication is {0, 1x, 2x, 3x}, wherein, x=ki/4, ki/2, or ki.

The value set of the scheduling gap indication in the DCI for scheduled paging is different from the value set of the scheduling gap indication in the DCI for scheduled unicast service. (Situation 1) The value set element quantity of the scheduling gap indication in the DCI for scheduled paging is the same as the value set quantity of the scheduling gap indication in the DCI for scheduled unicast service, but the specific value elements are different, wherein the element gaps of the former value set are even larger. For example the maximum k value in the the scheduled paging non-continuous value set is greater than the maximum k value in the scheduled unicast service non-continuous value set; when using two-level indication, k4 of the first-level indication is different, and the mode for obtaining the subsequent k1-k3 is different as well. For example, within the scheduled paging non-continuous value set, k3=k4/4, k2=k4/16, k1=k4/64; within the scheduled unicast service non-continuous value set, k3=k4/2, k2=k4/4, k1=k4/8; (Situation 2) The value set element quantity of the scheduling gap indication in the DCI for scheduled paging is greater than the value set quantity of the scheduling gap indication in the DCI for scheduled unicast service, but the specific value elements are different, wherein the element gap of the former value set is even larger.

The units corresponding to the values of the value sets are resource units of the service channel, physical subframes, or available subframes. Optimally, when two-level indication determines the NB-PUSCH scheduling gap, the first-level indication unit is the resource unit, and the second-level indication unit is the subframe.

Within the embodiments of the present invention, the value of the element in the data set comprises at least one of the following: $2^x$, wherein, x is at least one of the following {0, 1, 2, 3, ..., 20}; an integer multiple of the radio frame length; such as {10, 20, 30, 40, ...}; an integer multiple of the number of subframes occupied by the transport block; if, for example, a transport block occupies at most 6 subframes, the value element can be {6, 12, 18, 24, ...}; an integer multiple of the control channel occupied subframes, $k \times 2^x$, wherein k is a positive integer greater than, or greater than or equal to, 0.

Within the embodiments of the present invention, the method for determining the maximum value of the element in the data set comprises at least one of the following: the length of the resource allocation cycle, the scheduling window, or the scheduling cycle; a unique value that is fixed or configured by the base station; respectively determined based on differing coverage rankings; determined based on at least one coverage ranking; determined based on the uplink single carrier transmission; determined based on the uplink subcarrier gap.

It should be noted that the method for determining the maximum value of the element in the data set comprises at least one of the following: the length of the resource allocation window, the scheduling cycle, or the scheduling window, that is, the maximum value of the element of the value set is equal to, or not greater than, the length of the cycle or the scheduling window; a unique value that is fixed or configured by the base station, that is, the maximum value of a value set is a unique value; respective determination based on differing coverage rankings, wherein the maximum value corresponding to different coverage rankings is different; determination based on at least one coverage ranking, that is, allowing the maximum value corresponding to different coverage rankings to be the same, such as the same corresponding maximum value for coverage rankings 0 and 1, and the same corresponding maximum value for coverage rankings 2 and 3; determination based on the uplink single carrier transmission, that is, the maximum value corresponding to uplink single carrier transmission and uplink multiple carrier transmission are different; determination based on the uplink subcarrier gap, such as the maximum value corresponding to the uplink 3.75 kHz subcarrier gap being different from the maximum value corresponding to the uplink 15 kHz subcarrier gap.

Within the embodiments of the present invention, when the the initial subframe of the NB-PDSCH or the NB-PUSCH is determined based on the resource allocation within the scheduling window, the scheduling non-continuous value is lesser than any value of the scheduling window length, the resource allocation within the scheduling window uses a continuous resource allocation of not more than X PRBs or subframes, wherein, the value of X is lesser than the scheduling window length, X is preferably 6, the scheduling gap is the final subframe of the NB-PDCCH to the initial subframe of the NB-PUSCH or the NB-PDSCH.

It should be noted that the above scheduling window can be expressed in different terminology, such as the scheduling cycle, the resource allocation cycle, the resource allocation range, etc.

Within the embodiments of the present invention, when the initial subframe of the NB-PUSCH or the NB-PDSCH is determined based on the resource allocation within the scheduling window, it is further jointly determined based on the offset value dynamically indicated by the DCI; the subframe resources occupied by the NB-PDSCH or the NB-PUSCH span the scheduling windows or are within the scheduling window.

Within the embodiments of the present invention, when the coverage enhancement scenario uses the resources configured by the resource allocation for repeat transmission R times, the method comprises at least one of the following: based on the resource allocation within the scheduling window, transmission is repeated R times between the scheduling windows; based on the resource allocation within the scheduling window, transmission is repeated Rin times within the scheduling window, and transmitted Rout times between scheduling windows, wherein, at least one of R, Rin, and Rout are notified by RRC, SIB, or DCI; R, Rin, and Rout are all positive integers.

Within the embodiments of the present invention, when the NB-PDCCH repeatedly transmits R times, the method comprises at least one of the following: when R is not greater than or lesser than Rx, transmission is repeated R times within the transmission window; when R is greater than Rx, transmission is repeated R times between transmission windows; when R is greater than Rx, transmission is repeated Rin times within the scheduling window, and is repeated Rout times between scheduling windows, wherein at least one of R, Rin, and Rout are notified by RRC, SIB, or DCI; Rx, R, Rin, and Rout are all positive integers.

Within the embodiments of the present invention, the method for determining the value of R, Rin, Rout, and Rx comprises at least one of the following: at least one of R, Rin, Rout, and Rx has a value of $2^x$, wherein, x is at least one of the following $\{0, 1, 2, 3, \ldots, 20\}$; R=Rin×Rout; at least one of R, Rin, and Rout is determined to have a different fixed value based on differing coverage rankings, or the base station configures one or a set of values; when configured as a set of values, specific values are notified in the DCI; Rx and/or Rin are determined by at least one of the following: coverage ranking, scheduling window length, and the maximum repetitions.

For example: Rx and/or Rin are determined to be 4 based on normal coverage; or Rx and/or Rin are determined to be not greater than the value of the scheduling window length according to the length of the scheduling window; or Rx and/or Rin are determined to be not greater than the scheduling window length and the maximum repetitions based on the length of the scheduling window and the maximum number of repetitions.

For example, with a window length of 32 ms, the NB-PDSCH is determined to occupy 6-11 subframes through resource allocation, the 3 bit information in the DCI indicates that R=32 in the value set $\{1, 2, 4, 8, 16, 32, 64, 128\}$ used for NB-PDSCH transmission. Method 1 is to repeat transmission in 32 scheduling windows, occupying the same subframe positions within each window; method 2 is for the base station to notify the scheduling window to repeat Rin=4 times, with the Rout implicitly obtained through the Rmax/Rin=8; in this case, the NB-PDSCH repeats transmission in 8 scheduling windows, repeating the transmission 4 times within the scheduling window.

Within the embodiments of the present invention, the NB-PDSCH occupies continuous subframes in the time domain, wherein the method for determining the number of occupied continuous subframes comprises at least one of the following: joint coding with the initial subframe within a preset indication range, using continuous resource allocation; separate indication within a limited value set, wherein the elements of the limited value set are continuous values or non-continuous values.

Within the embodiments of the present invention, the mode for occupying resources of the NB-CCE used by the NB-PDCCH in 1 PRB pair or 1 subframe comprises one of the following: occupying the same 6 continuous or non-continuous subcarriers on all the Orthogonal Frequency Division Multiplexing (OFDM) symbols; occupying 6 different non-continuous subcarriers on different OFDM symbols; occupying 6 different continuous subcarriers on different OFDM symbols.

It should be noted that the NB-CCE occupies different resources based on different cell IDs in the subframe or the OFDM symbol. For example, NB-CCE patterns used by different cells use different specific resources for multiple resource occupation modes and the same resource occupation mode listed above.

It should be noted that the PRB pair specifically contains 12 subcarriers in the frequency domain, and 12 or 14 OFDM symbols in the time frequency domain; wherein, with 14 OFDM symbols, normal CP is used; with 12 OFDM symbols, Extended CP is used.

Within the embodiments of the present invention, the search space where the NB-PDCCH is located contains 1 or multiple aggregation levels, and the determination method for candidate set quantities corresponding to the different repetition frequencies of different aggregation levels comprises at least one of the following: when different aggregation levels are at different repetition frequencies, the number of candidate sets is one; when different aggregation levels are at different repetition frequencies, the number of candidate sets varies; the number of candidate sets corresponding to an aggregation level of 1 is greater than 1; the number of candidate sets corresponding to the non-maximum repetitions is greater than 1; when the repetitions is greater than, or greater than or equal to, the threshold value Rx, the number of the candidate sets is equal to 1; when the repetitions is lesser than, or lesser than or equal to, Rx, the number of candidate sets is greater than 1.

Within the embodiments of the present invention, the length of the scheduling window is determined by at least one of the following: the resource element length, the scheduling gap, and the non-continuous transmission gap. The length of the scheduling window is configured by the eNB through SIB or RRC, or is a fixed length. Determination methods comprise at least one of the following: the length is greater than at least one of the following: the resource element length, the scheduling gap, the non-continuous transmission gap; the length is an integer multiple of at least one of the following: the resource element length, the scheduling gap, the non-continuous transmission gap; the length satisfies $2^x$, wherein, x is at least one of the following: $\{1, 2, 3, \ldots, 20\}$; the length satisfies an integer multiple of the radio frame length.

Within the embodiments of the present invention, the uplink scheduling window length and the downlink scheduling window length are the same, fixed or uniformly configured; or, the uplink scheduling window length and the downlink scheduling window length are independently configured or take a different fixed value.

For example, when one RU occupies 32 ms, the window length is an integer multiple of 32; preferably, the window length is at least one of the following set: $\{32, 64, 128, 256, 512, 768, 1024, 1280, 1536, 1792, 2048\}$.

Within the embodiments of the present invention, the initial subframe of the search space where the NB-PDCCH is located is determined based on at least one of the following: the scheduling window length, the offset value, the maximum repetitions (Rmax), and the resource allocation cycle.

Within the embodiments of the present invention, when the initial subframe is determined based on the cycle T and the offset value, the position of the initial subframe, the position of the initial subframe plus the offset value, or the position of the initial subframe minus the offset value is an integer multiple of T, wherein, the offset value is not greater than the length of the scheduling window, wherein, the cycle (T) is the scheduling window length, the scheduling cycle, or the resource allocation cycle, or an integer multiple of the resource allocation cycle, the scheduling cycle, or the scheduling window length.

It should be noted that the offset value is lesser than the window length ½, ¼, a value that is predefined or configured by the base station, such as 0, 1, 2, 3.

Preferably, k mode N=0, or (k−offset) mode N=0, or (k+offset) mode N=0, wherein k=$\lfloor n_f/2 \rfloor$+10·SFN, $n_f$ indicates the time slot number, SFN is the radio frame number, k expresses the initial subframe, N expresses the scheduling window length or an integer multiple of the scheduling window length, and offset indicates the offset value.

Within the embodiments of the present invention, when the initial subframe is determined based on the maximum repetitions, the method comprises at least one of the following: the initial subframe is located at the first subframe of the cycle; the cycle is an integer multiple of the Rmax, wherein, the value of the integer multiple is a continuous value (1, 2, 3, 4) or a non-continuous value (1, 2, 4, 8); the initial subframe is located at the first subframe of the cycle plus the offset, the offset value is an integer multiple of Rmax/i, the cycle is an integer multiple of the Rmax, and i is preferably 8, wherein, the value of the integer multiple is a continuous value (1, 2, 3, 4) or a non-continuous value (1, 2, 4, 8).

Within the embodiments of the present invention, the cycle is a value set determined by an integer multiple or a non-integer multiple of Rmax; or the cycle is a value set determined by an integer multiple or a non-integer multiple or Rmax plus the constant (m), comprising at least one of the following: the value set comprises positive integers greater than or equal to 10; considering that NB-IoT has narrower bandwidth when compared to eMTC, it requires longer cycles and better time division multiplexing within the time domain to open up different terminals; the value set does not contain 1; the value set contains non-positive integers greater than 1 and lesser than 5.

Distinguish between different value sets based on the threshold Rmax=E, wherein, E is a fixed constant or a constant configured by high-layer signaling. For example: {1, 2, 3, 4, 5, 6, 8, 10}, {2, 4, 6, 8, 10, 16, 24, 32}, {1.5, 2, 3, 4, 5, 6, 8, 10}, {1.5, 2, 4, 6, 8, 10, 12, 16}, wherein the constant (m) is preferably 4. Distinguish between different value sets based on the threshold Rmax=E; when Rmax>=E or Rmax>E, the value set is X1; when Rmax<E or Rmax<=E, the value set is X2; the minimum value of X1 is lesser than the minimum value of X2; or X1 contains decimals, and X2 contains decimals; the maximum value of X1 is lesser than the maximum value of X2; within the embodiments of the present invention, the value sets corresponding to the USS and the CSS are different, wherein, CSS is used to access the CSS process; the value set comprises at least one of the following: the CSS value set does not contain non-positive integers; the minimum value of the CSS value set is greater than the minimum value of the USS value set; the maximum value of the CSS value set is greater than the maximum value of the USS value set.

For example, the CSS value set is {2, 3, 4, 5, 6, 8, 10, 16} and the USS value set is {1.5, 2, 3, 4, 5, 6, 8, 10}; the CSS value set is {2, 4, 6, 8, 10, 16, 24, 32} and the USS value set is {1.5, 2, 4, 6, 8, 10, 12, 16}; the CSS value set is {2, 3, 4, 5, 8, 10, 16, 32} and the USS value set is {1.5, 2, 2.5, 4, 5, 8, 10,16}.

Within the embodiments of the present invention, when configuring the gap position within the cycle and the cycle, the unit for the cycle and/or the gap is a subframe or a multiple of Rmax/i, wherein the cycle and the gap duration are respectively configured or configured through joint coding, wherein i is an integer from 1 to 8.

As demonstrated by Table 1, when different cycles are configured through joint coding, gap duration values are different, and the gap duration is not greater than its corresponding cycle value.

TABLE 1

| Index | Cycle | Gap size |
|-------|-------|----------|
| 0 | 64 | 48 |
| 1 | 64 | 32 |
| 2 | 64 | 16 |
| 3 | 64 | 8 |
| 4 | 32 | 24 |
| 5 | 32 | 16 |
| 6 | 32 | 8 |
| 7 | 16 | 8 |

Within the embodiments of the present invention, the method for determining the gap duration within the cycle and the cycle according to the threshold value comprises at least one of the following: the maximum value of the cycle is lesser than, or lesser than or equal to, the threshold value; the maximum value for the gap duration is lesser than the cycle value; the maximum value for the gap duration is lesser than the threshold value, wherein, the threshold value is a fixed value or is a value configured by high-layer signaling.

For example, the threshold value is 64; when the Rmax>=64, the maximum value of the cycle is 64, and the maximum value for the gap duration is less than 64.

When the NB-PDCCH or the NB-PDSCH or the NB-PUSCH repeats transmission, the base station uses high-layer signaling (e.g, SIB or RRC) or physical-layer signaling (e.g, DCI) to notify that its repeated transmission is continuous transmission or gap/non-continuous transmission, which comprises at least one of the following:

(1) Only configure whether or not to perform non-continuous transmission, and non-continuous transmission is implicitly determined.

For example, configuring continuous or non-continuous transmission through 1 bit; the gap is located between Rmax/2, the gap duration is Rmax, Rmax/2, or a fixed value.

(2) Configure the number of gaps for non-continuous transmission, and the gap position is implicitly determined.

Figure 2:
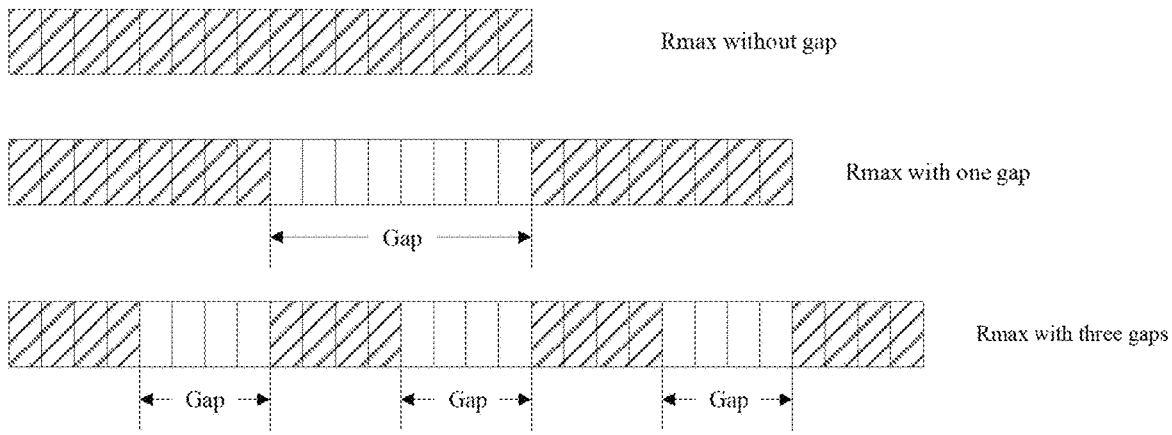
FIG. 2 is a schematic diagram of implicitly determining the gap position and the gap number for non-continuous transmission based on the preferred embodiments of the present invention.

FIG. 2 is a schematic diagram of implicitly determining the gap position and the gap number for non-continuous transmission based on the preferred embodiments of the present invention. As is shown in FIG. 2, for example, the number of gaps for non-continuous transmission is configured with 2 bit. 0 expresses continuous transmission; 1 expresses that there is 1 gap, that the gap is located between Rmax2, and that the gap duration is Rmax/2; 2 expresses that there are 3 gaps, that the gap is located between Rmax/4, and that the gap duration is Rmax/4; 3 expresses that there are 7 gaps, that the gap is located between Rmax/8, and that the gap duration is Rmax/8.

(3) Configure a preset cycle, and the gap location within the cycle.

Figure 3:
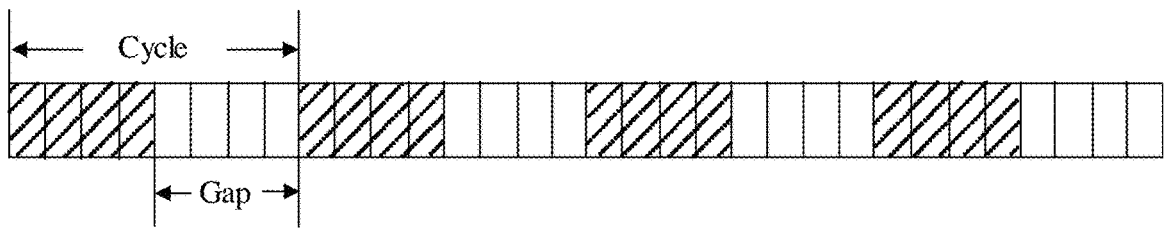
FIG. 3 is a schematic diagram for configuring the preset cycle, and the gap position within the cycle, based on the preferred embodiments of the present invention.

FIG. 3 is a schematic diagram for configuring the preset cycle and the gap position within the cycle, based on the preferred embodiments of the present invention; as is shown in FIG. 3, when configuring a preset cycle and the gap location within the cycle, the gap is divided within the cycle and the gap duration does not exceed the cycle size. The transmission cycle, and the start and length of the transmission gap within the cycle, should be defined. Simply put, the gap can only be configured at the initial or final position of the cycle. As FIG. 3 shows, when configuring the cycle length and the gap length within the cycle, the cycle length and the gap are in a predefined value set, optimally configured to different values based on coverage rankings. When the repeat transmission of the NB-PDCCH or the NB- PDSCH encounters the gap and there is no transmission completion, the gap is skipped. The non-continuous value can be the element in the repeat transmission frequency value set used by the NB-PDCCH or the NB-PDSCH, such as 1, 2, 4, 16, 32 . . . , or an integer multiple of the radio frame: 10, 20, 30, 40. . . .

(4) Configure a preset cycle, and the cycle size is equal to the gap duration.

Figure 4:
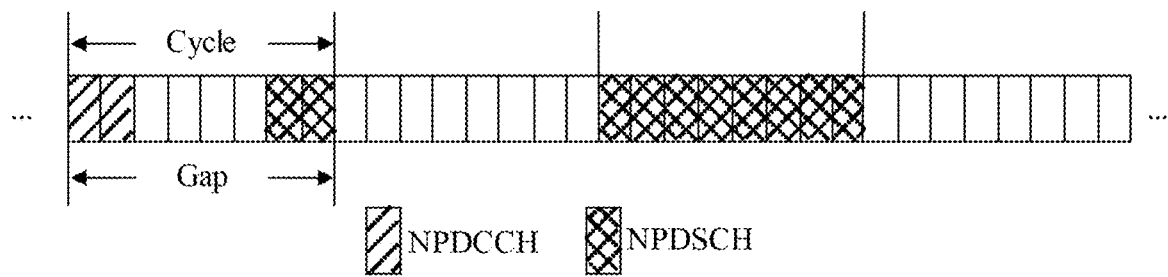
FIG. 4 is a schematic diagram for configuring the preset cycle, where the cycle size is equal to the gap duration, based on the preferred embodiments of the present invention.

FIG. 4 is a schematic diagram for configuring the preset cycle, where the cycle size is equal to the gap duration, based on the preferred embodiments of the present invention. As FIG. 4 shows, a uniform non-continuous value is defined, and the non-continuous value equals the cycle value. When the NB-PDCCH (also called the NPDCCH, both refer to the physical downlink control channel of the NB-IoT) and/or the NB-PDSCH repeat transmissions, as long as the gap border is encountered and there is no transmission completion, one gap is skipped before continuing transmission. The non-continuous value can be the element in the repeat transmission frequency value set used by the NB-PDCCH or the NB-PDSCH, such as 1, 2, 4, 16, 32 . . . , or an integer multiple of the radio frame: 10, 20, 30, 40 . . . .

The cell level gap transmission is configured by the SIB, and all of the downlink channels are suitable, or only the NB-PDSCH or the NB-PDCCH of the common message is suitable. The UE level gap transmission is configured by the RRC or the DCI, such as the NB-PDCCH and/or the NB-PDSCH configured by the RRC, and the NB-PDSCH gap transmission configured by the DCI.

(5) A fixed cycle and a fixed gap duration, with a fixed value that is a power of 2, an integer multiple of the radio frame, or an integer multiple of 8.

It should be noted that the method for determining the scheduling gap of the above embodiments can be applied to the terminal or the base station.

The present embodiments further provide an apparatus for determining the scheduling gap; the apparatus is used to implement the above embodiments and their preferred methods; what has already been described will not be discussed further. As is used below, the term "module" can be a combination of software and/or hardware that can implement a preset function. Although the apparatus of the embodiments described below are optimally implemented with software, implementing them with hardware, or a combination of software and hardware, is also conceivable.

Figure 5:
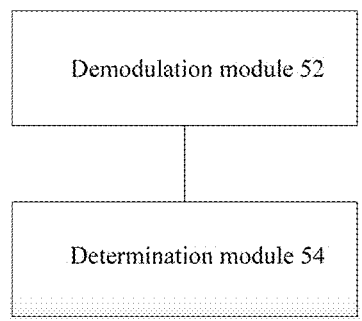
FIG. 5 is a structural diagram of an apparatus for determining the scheduling gap based on the preferred embodiments of the present invention.

FIG. 5 is a structural diagram of an apparatus for determining the scheduling gap based on the preferred embodiments of the present invention; as FIG. 5 shows, the apparatus comprises: the demodulation module 52, set up to demodulate the NarrowBand Physical Downlink Control Channel (NB-PDCCH); the determination module 54, set up to determine the initial subframe of the NarrowBand Physical Uplink Shared Channel (NB-PUSCH) or the NarrowBand (Physical) Downlink Shared Channel (NB-PDSCH) through NB-PDCCH demodulation, wherein, the basis for determining the initial subframe comprises at least one of the following: the final subframe of the NB-PDCCH, the final subframe of the search space where the NB-PDCCH is located, resource allocation within the scheduling window, and scheduling gap indication.

The implementation of the above apparatus, whereby the demodulation module 52 is set up to demodulate the NarrowBand Physical Downlink Control Channel (NB-PDCCH), and the determination module 54 is set up to determine the initial subframe of the NarrowBand Physical Uplink Shared Channel (NB-PUSCH) or the NarrowBand (Physical) Downlink Shared Channel (NB-PDSCH) through NB-PDCCH demodulation, resolves the problem of how to determine the scheduling timing within the NarrowBand system, thereby saving indication expenditure and increasing resource usage efficiency.

For the above apparatus, the demodulation module 52 and the determination module 54 can independently implement their respective functions, and can also jointly implement the function of the apparatus.

Within the embodiments of the present invention, when determining the initial subframe of the NB-PUSCH or the NB-PDSCH based on the final subframe of the NB-PDCCH, a fixed scheduling gap is used.

Within the embodiments of the present invention, when one Physical Resource Block (PRB) pair supports multiple NB-PDSCH, and the fixed scheduling gap is used to determine the initial subframe of the NB-PDSCH, indicate the NB-PDSCH position within a PRB through Downlink Control Information (DCI) or the implicit determination mode.

Within the embodiments of the present invention, when the initial subframe of the NB-PUSCH or the NB-PDSCH is determined according to the final subframe of the search space where the NB-PDCCH is located, a fixed scheduling gap or an indication based on the scheduling gap is used, wherein, the scheduling gap indication expresses the final subframe of the search space where the NB-PDCCH is located to the initial subframe of the NB-PUSCH or the NB-PDSCH.

Within the embodiments of the present invention, when the initial subframe of the NB-PUSCH or the NB-PDSCH is determined according to the final subframe of the NB-PDCCH and the scheduling gap indication, the set of values for the scheduling gap used is a finite value, the element values of the value set are continuous or non-continuous values, the value set is fixed or configured by the Radio Resource Control (RRC) or the System Information Block (SIB), wherein, the scheduling gap indication expresses the final subframe of the NB-PDCCH to the initial subframe of the NB-PUSCH or the NB-PDSCH.

Within the embodiments of the present invention, the scheduling gap indication comprises one of the following modes: single indication, and two-level indication, wherein, the single indication uses a single parameter to indicate the scheduling gap, the first-level indication of the two-level indication is a single indication parameter; the second-level indication of the two-level indication indicates the offset value based on the first-level indication; the value set is fixed or configured by the RRC or the SIB.

Within the embodiments of the present invention, the value of the element in the data set comprises at least one of the following: $2^x$, wherein, x is at least one of the following $\{0, 1, 2, 3, \ldots, 20\}$; an integer multiple of the radio frame length; such as $\{10, 20, 30, 40, \ldots\}$; an integer multiple of the number of subframes occupied by the transport block; if, for example, a transport block occupies at most 6 subframes, the value element can be $\{6, 12, 18, 24, \ldots\}$; an integer multiple of the control channel occupied subframes, $k \times 2^x$, wherein k is a positive integer greater than, or greater than or equal to, 0.

Within the embodiments of the present invention, the method for determining the maximum value of the element in the data set comprises at least one of the following: the length of the resource allocation cycle, the scheduling window, or the scheduling cycle; a unique value that is fixed or configured by the base station; respectively determined based on differing coverage rankings; determined based on at least one coverage ranking; determined based on the uplink single carrier transmission; determined based on the uplink subcarrier gap.

It should be noted that the method for determining the maximum value of the element in the data set comprises at least one of the following: the length of the resource allocation window, the scheduling cycle, or the scheduling window, that is, the maximum value of the element of the value set is equal to, or not greater than, the length of the cycle or the scheduling window; a unique value that is fixed or configured by the base station, that is, the maximum value of a value set is a unique value; respective determination based on differing coverage rankings, wherein the maximum values corresponding to different coverage rankings are different; determination based on at least one coverage ranking, that is, allowing the maximum value corresponding to different coverage rankings to be the same, such as the same corresponding maximum value for coverage rankings 0 and 1, and the same corresponding maximum value for coverage rankings 2 and 3; determination based on the uplink single carrier transmission, that is, the maximum value corresponding to uplink single carrier transmission and uplink multiple carrier transmission are different; determination based on the uplink subcarrier gap, such as the maximum value corresponding to the uplink 3.75 kHz subcarrier gap being different from the maximum value corresponding to the uplink 15 kHz subcarrier gap.

Within the embodiments of the present invention, when the initial subframe of the NB-PDSCH or the NB-PUSCH is determined based on the resource allocation within the scheduling window, the scheduling non-continuous value is lesser than any value of the scheduling window length; the resource allocation within the scheduling window uses a continuous resource allocation of not more than X PRBs or subframes, wherein, the value of X is lesser than the scheduling window length, X is preferably 6, and the scheduling gap is the final subframe of the NB-PDCCH to the initial subframe of the NB-PUSCH or the NB-PDSCH.

It should be noted that different terminology can be used to refer to the scheduling window, such as the scheduling cycle, the resource allocation cycle, and the resource allocation range, etc.

Within the embodiments of the present invention, when the initial subframe of the NB-PUSCH or the NB-PDSCH is determined based on the resource allocation within the scheduling window, it is further jointly determined based on the offset value dynamically indicated by the DCI; the subframe resources occupied by the NB-PDSCH or the NB-PUSCH span scheduling windows or are within the scheduling window only.

Within the embodiments of the present invention, when the coverage enhancement scenario uses the resources configured by the resource allocation for repeat transmission R times, the method comprises at least one of the following: based on the resource allocation within the scheduling window, transmission is repeated R times between the scheduling windows; based on the resource allocation within the scheduling window, transmission is repeated Rin times within the scheduling window, and transmitted Rout times between scheduling windows, wherein, at least one of R, Rin, and Rout are notified by RRC, SIB, or DCI; R, Rin, and Rout are all positive integers.

Within the embodiments of the present invention, when the NB-PDCCH repeatedly transmits R times, the method comprises at least one of the following: when R is not greater than or lesser than Rx, transmission is repeated R times within the transmission window; when R is greater than Rx, transmission is repeated R times between transmission windows; when R is greater than Rx, transmission is repeated Rin times within the scheduling window, and is repeated Rout times between scheduling windows, wherein at least one of R, Rin, and Rout are notified by RRC, SIB, or DCI; Rx, R, Rin, and Rout are all positive integers.

Within the embodiments of the present invention, the method for determining the value of R, Rin, Rout, and Rx comprises at least one of the following: at least one of R, Rin, Rout, and Rx has a value of $2^x$, wherein, x is at least one of the following $\{0, 1, 2, 3, \ldots, 20\}$; R=Rin×Rout; at least one of R, Rin, and Rout is determined to have a different fixed value based on differing coverage rankings, or the base station configures one or a set of values; when configured as a set of values, specific values are notified in the DCI; Rx and/or Rin are determined by at least one of the following: coverage ranking, scheduling window length, and the maximum repetitions.

For example, Rx and/or Rin are determined to be 4 based on normal coverage; or Rx and/or Rin are determined to be not greater than the value of the scheduling window length according to the length of the scheduling window; or Rx and/or Rin are determined to be not greater than the scheduling window length and the maximum repetitions based on the length of the scheduling window and the maximum repetitions.

For example, with a window length of 32 ms, the NB-PDSCH is determined to occupy 6-11 subframes through resource allocation, the 3 bit information in the DCI indicates that R=32 in the value set $\{1, 2, 4, 8, 16, 32, 64, 128\}$ used for NB-PDSCH transmission. Method 1 is to repeat transmission in 32 scheduling windows, occupying the same subframe position within each window; method 2 is for the base station to notify the scheduling window to repeat Rin=4 times, with the Rout implicitly obtained through the Rmax/Rin=8, wherein, the NB-PDSCH repeats transmission in 8 scheduling windows, repeating the transmission 4 times within the scheduling window.

Within the embodiments of the present invention, the NB-PDSCH occupies continuous subframes in the time domain; the method for determining the number of occupied continuous subframes comprises at least one of the following: joint coding with the initial subframe within a preset indication range, using continuous resource allocation; separate indication within a limited value set, wherein the elements of the limited value set are continuous values or non-continuous values.

Within the embodiments of the present invention, the mode for occupying resources of the NB-CCE used by the NB-PDCCH in 1 PRB pair or 1 subframe comprises one of the following: occupying the same 6 continuous or non-continuous subcarriers on all the Orthogonal Frequency Division Multiplexing (OFDM) symbols; occupying 6 different non-continuous subcarriers on different OFDM symbols; occupying 6 different continuous subcarriers on different OFDM symbols.

It should be noted that the NB-CCE occupies different resources based on different cell IDs in the subframe or the OFDM symbol. For example, NB-CCE patterns used by different cells have different specific resources for multiple resource occupation modes and the same resource occupation mode listed above.

It should be noted that the PRB pair specifically contains 12 subcarriers in the frequency domain, and 12 or 14 OFDM symbols in the time domain; wherein, with 14 OFDM symbols, normal CP is used; with 12 OFDM symbols, Extended CP is used.

Within the embodiments of the present invention, the search space where the NB-PDCCH is located contains 1 or multiple aggregation levels, and the determination method for candidate set quantities corresponding to the different repetition frequencies of different aggregation levels comprises at least one of the following: when different aggregation levels are at different repetition frequencies, the number of candidate sets is one; when different aggregation levels are at different repetition frequencies, the number of candidate sets varies; the number of candidate sets corresponding to an aggregation level of 1 is greater than 1; the number of candidate sets corresponding to the non-maximum repetitions is greater than 1; when the repetitions are greater than, or greater than or equal to, the threshold value Rx, the number of candidate sets is equal to 1; when the repetitions are lesser than, or lesser than or equal to, Rx, the number of candidate sets is greater than 1.

Within the embodiments of the present invention, the length of the scheduling window is detetiiiined by at least one of the following: the resource element length, the scheduling gap, and the non-continuous transmission gap. The length of the scheduling window is configured by the eNB through the SIB or the RRC, or is a fixed length. Determination methods comprise at least one of the following: the length is greater than at least one of the following: the resource element length, the scheduling gap, the non-continuous transmission gap; the length is an integer multiple of at least one of the following: the resource element length, the scheduling gap, the non-continuous transmission gap; the length satisfies $2^x$, wherein, x is at least one of the following: $\{1, 2, 3, \ldots, 20\}$; the length satisfies an integer multiple of the radio frame length.

Within the embodiments of the present invention, the uplink scheduling window length and the downlink scheduling window length are the same, fixed or uniformly configured; or, the uplink scheduling window length and the downlink scheduling window length are independently configured or take a different fixed value.

For example, when one RU occupies 32 ms, the window length is an integer multiple of 32; preferably, the window length is at least one of the following set: $\{32, 64, 128, 256, 512, 768, 1024, 1280, 1536, 1792, 2048\}$.

Within the embodiments of the present invention, the initial subframe of the search space where the NB-PDCCH is located is determined based on at least one of the following: the scheduling window length, the offset value, the maximum repetitions (Rmax), and the resource allocation cycle.

Within the embodiments of the present invention, when the initial subframe is determined based on the cycle T and the offset value, the position of the initial subframe, the position of the initial subframe plus the offset value, or the position of the initial subframe minus the offset value is an integer multiple of T, wherein, the offset value is not greater than the length of the scheduling window; wherein, the cycle (T) is the scheduling window length, the scheduling cycle, or the resource allocation cycle, or an integer multiple of the resource allocation cycle, the scheduling cycle, or the scheduling window length.

It should be noted that the offset value is lesser than the window length ½, ¼, a value that is predefined or configured by the base station, such as 0, 1, 2, 3.

Optimally, k mode N=0, or (k−offset) mode N=0, or (k+offset) mode N=0, wherein, $k = \lfloor n_f/2 \rfloor + 10 \cdot SFN$, $n_f$ indicates the time slot number, SFN is the radio frame number, k expresses the initial subframe, N expresses the scheduling window length or an integer multiple of the scheduling window length, and offset indicates the offset value.

The present invention is described in detail below with reference to the preferred embodiments and the implementation methods thereof.

Figure 6:
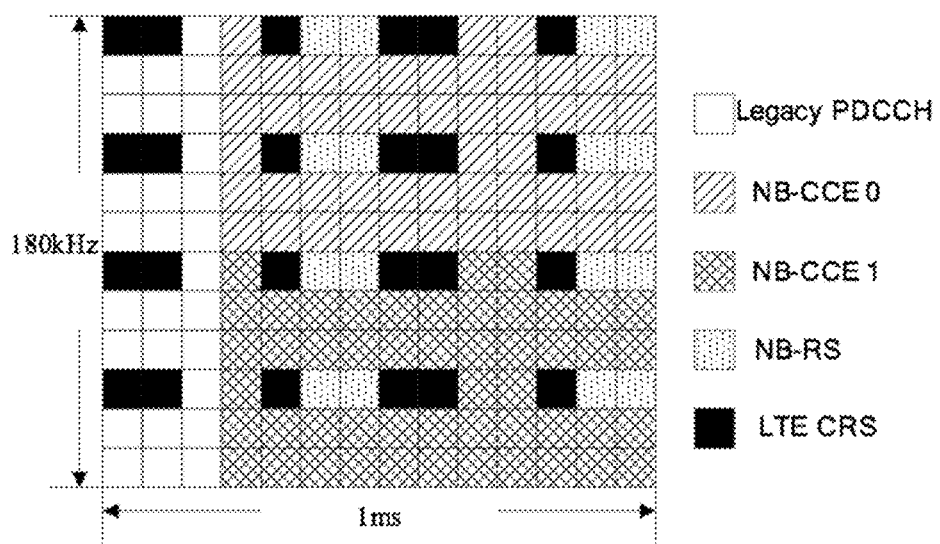
FIG. 6 is a schematic diagram of the NB-CCE occupying the same continuous 6 subcarriers in all of the OFDM symbols based on the preferred embodiments of the present invention.
Figure 7:
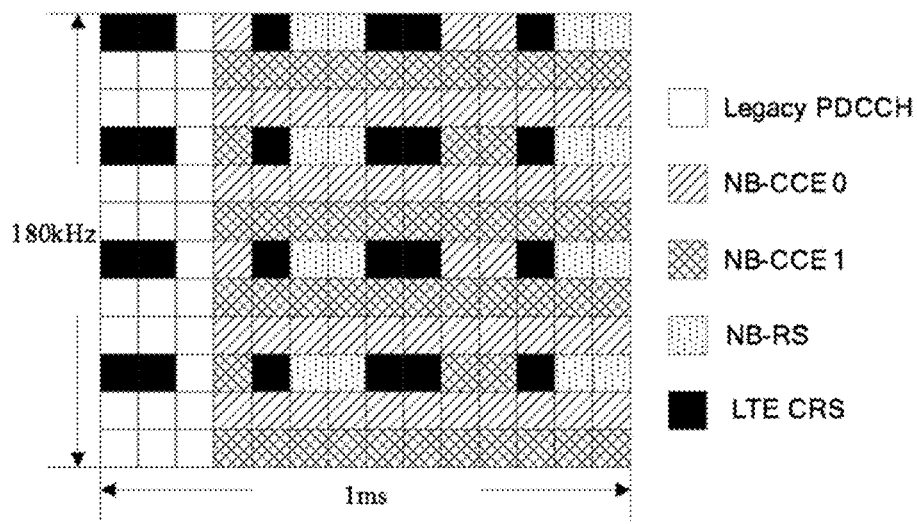
FIG. 7 is a schematic diagram of the NB-CCE occupying the same non-continuous 6 subcarriers in all of the OFDM symbols based on the preferred embodiments of the present invention.
Figure 8:
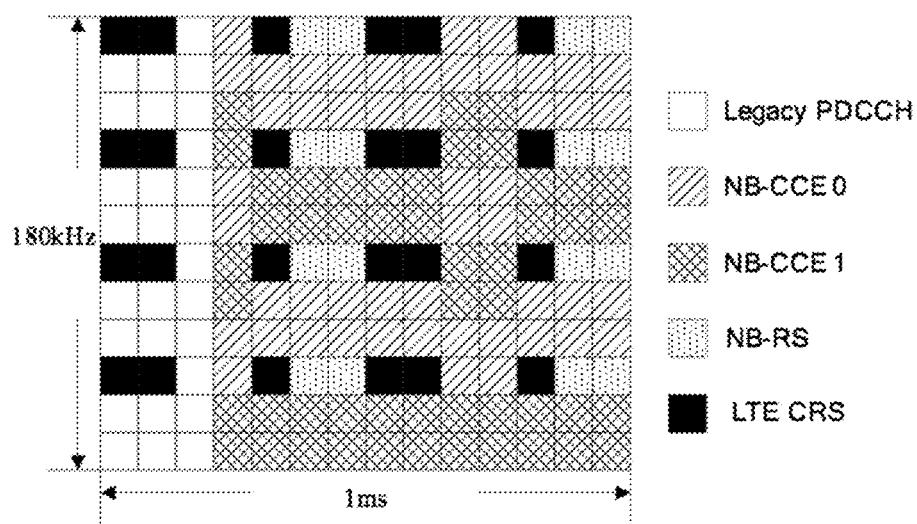
FIG. 8 is a schematic diagram of the NB-CCE occupying 6 different non-continuous subcarriers on different OFDM symbols based on the preferred embodiments of the present invention.

In the present embodiments, the specific resource occupation method of the NB-CEE used by the NB-PDCCH in 1 PRB pair or 1 subframe comprises one of the following: occupying the same continuous or non-continuous 6 subcarriers in all of the OFDM symbols; specifically, FIG. 6 is a schematic diagram of the NB-CCE occupying the same continuous 6 subcarriers in all of the OFDM symbols based on the preferred embodiments of the present invention; occupying the same continuous 6 subcarriers comprises: occupying the first 6 or final 6 subcarriers in the subcarriers 0-11 in all of the OFDM symbols (as FIG. 6 shows). FIG. 7 is a schematic diagram of the NB-CCE occupying the same non-continuous 6 subcarriers in all of the OFDM symbols based on the preferred embodiments of the present invention; occupying the same non-continuous 6 subcarriers comprises: (1) occupying the odd-numbered subcarriers or the even-numbered subcarriers (as FIG. 7 shows); (2) using 2 or 3 consecutive subcarriers to occupy 12 subcarriers at even intervals, such as NB-CCE #0 occupying subcarriers $\{0, 1, 4, 5, 8, 9\}$ or $\{0, 1, 2, 6, 7, 8\}$; (3) using 2 or 4 consecutive subcarriers to occupy 12 subcarriers at irregular gaps, such as NB-CCEE #0 occupying subcarriers $\{0, 1, 4, 5, 6, 7\}$, or $\{0, 1, 6, 7, 8, 9\}$; occupying 6 different non-continuous subcarriers on different OFDM symbols; specifically. FIG. 8 is a schematic diagram of the NB-CCE occupying 6 different non-continuous subcarriers on different OFDM symbols based on the preferred embodiments of the present invention; the RE used by two NB-CCE is able to guarantee that the SFBC is adjacent to the RE, but the NB-CCE does not occupy 6 continuous subcarriers, as is shown in FIG. 8; occupying 6 different continuous subcarriers on different OFDM symbols; specifically, RE used by two NB-CCE is able to guarantee that the SFBC pair is adjacent to the RE and that the NB-CCE is occupying 6 consecutive subcarriers; but the 6 consecutive subcarriers occupied by the NB-CCEE in different OFDM symbols are different. For example, odd-numbered OFDM symbols use 6 subcarriers of one type, and the even-numbered OFDM symbols use 6 subcarriers of another type.

Figure 9:
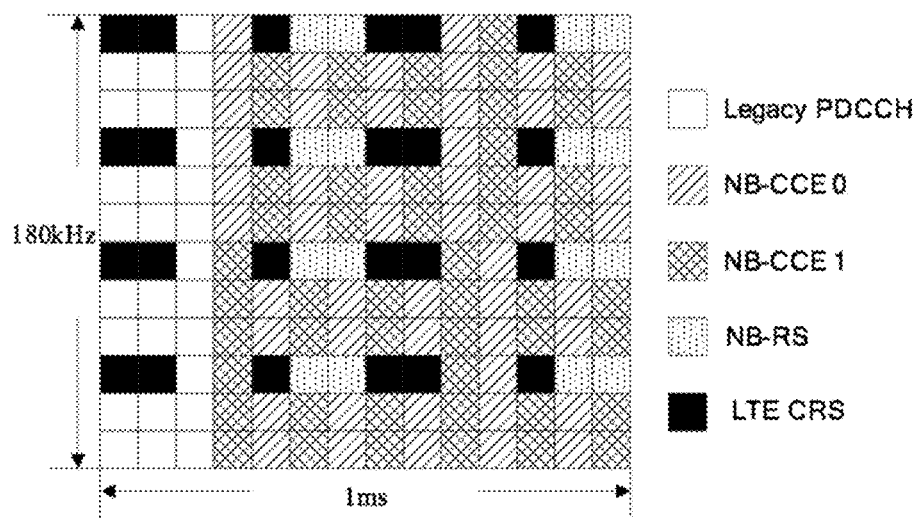
FIG. 9 is schematic diagram 1 of the NB-CCE occupying 6 different continuous subcarriers on different OFDM symbols based on the preferred embodiments of the present invention.
Figure 10:
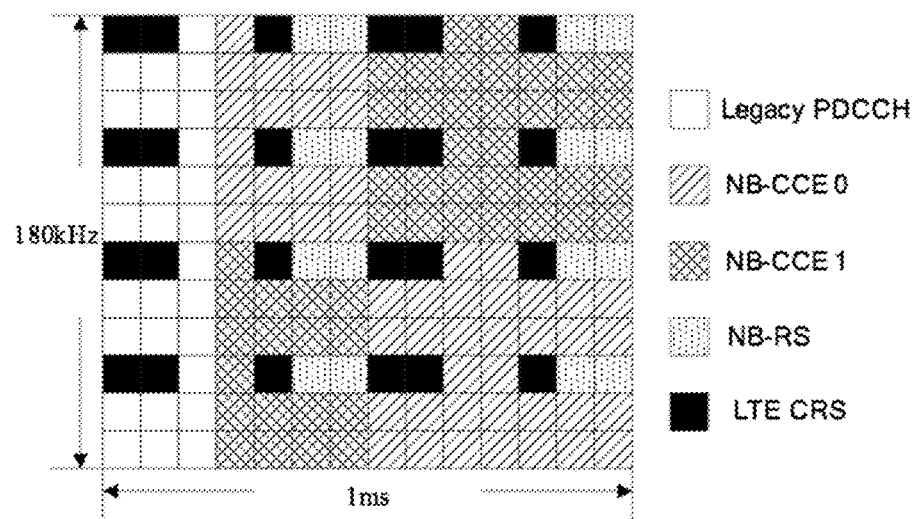
FIG. 10 is schematic diagram 2 of the NB-CCE occupying 6 different continuous subcarriers on different OFDM symbols based on the preferred embodiments of the present invention.

FIG. 9 is schematic diagram 1 of the NB-CCE occupying 6 different continuous subcarriers on different OFDM symbols based on the preferred embodiments of the present invention, as is shown in FIG. 9; FIG. 10 is schematic diagram 2 of the NB-CCE occupying 6 different continuous subcarriers on different OFDM symbols based on the preferred embodiments of the present invention; the OFDM symbols in time-slot 0 use the same 6 subcarriers, and the OFDM symbols in time-slot 1 use 6 subcarriers of another type, as is shown in FIG. 10. A portion of the OFDM symbols uses the same 6 subcarriers, and another portion of the OFDM symbols uses another 6 subcarriers.

Within the embodiments of the present invention, the search space where the NB-PDCCH is located contains 1 or multiple aggregation levels, and the determination method for candidate set quantities corresponding to the different repetition frequencies of different aggregation levels comprises at least one of the following: when different aggregation levels are at different repetition frequencies, the number of candidate sets is one; for example, {L,R, candidate set number}=[{1,R1,1}, {1,R2,1}, {1,R3,1}, {1,R4,1}, {2,R1,1}, {2,R2,1}, {2,R3,1}, {2,R4,1}], or {L,R, candidate set number}=[{2,R1,1}, {2,R2,1}, {2,R3,1}, {2,R4,1}]

when different aggregation levels are at different repetition frequencies, the number of candidate sets varies; for example, {L,R, candidate set number}=[{1,1,16}, {2,1,8}, {2,2,4}, {2,4,2}, {2,8,1}], or [{2,1,4}, {2,2,4}, {2,4,1}, {2,8,1}] the number of candidate sets corresponding to an aggregation level of 1 is greater than 1; for example, {L,R, candidate set number}=[{1,R1,16}, {2,R1,8}, {2,R2,4}, {2,R3,2}, {2,R4,1}], or [{1,R1,16}, {2,R1,8}, {2,R2,1}, {2,R3,1}, {2,R4,1}], or [{1,1,8}, {2,1,4}, {2,2,2}, {2,4,1}], or [{1,R1,4}, {1,R2,2}, {1,R3,1}, {1,R4,1}, {2,R1,1}, {2,R2,1}, {2,R3,1}, {2,R4,1}] the number of candidate sets corresponding to the non-maximum repetitions is greater than 1; for example, {L,R, candidate set number}=[{1,R1,8}, {1,R2,4}, {1,R3,2}, {1,R4,1}, {2,R1,8}, {2,R2,4}, {2,R3,2}, {2,R4,1}], or {L,R, candidate set number}=[{2,R1,8}, {2,R2,4}, {2,R3,2}, {2,R4,1}] when the repetitions is greater than, or greater than or equal to, the threshold value Rx, the number of the candidate sets is equal to 1; when the repetitions is lesser than, or lesser than or equal to, Rx, the number of candidate sets is greater than 1; for example, {L,R, candidate set number}=[{1,R1,8}, {1,R2,4}, {1,R3,1}, {1,R4,1}, {2,R1,8}, {2,R2,4}, {2,R3,1}, {2,R4,1}], or [{2,R1,8}, {2,R2,4}, {2,R3,1}, {2,R4,1}], or [{2,R1,8}, {2,R2,1}, {2,R3,1}, {2,R4,1}], or [{1,1,8}, {2,1,4}, {2,2,1}, {2,4,1}], or [{1,1,8}, {2,1,1}, {2,2,1}, {2,4,1}].

It should be noted that the candidate set number is greater than 1 in order to fill the search space, or fill the search space as much as possible, and the candidate set number corresponding to different aggregation levels is the same; or, the candidate set number corresponding to low aggregation levels is a multiple of the candidate set number corresponding to high aggregation levels; for example, the number of candidate sets corresponding to an aggregation level of 1 is a multiple of the candidate set number corresponding to an aggregation level of 2. Specifically, if the search space only contains one or two aggregation levels, the repetitions corresponding to the aggregation level is, for example, R1, R2, R3, R4, wherein 8R1=4R2=2R3=R4, and the candidate set number corresponding to at least one non-maximum number of repetitions is greater than 1; the R value is at least one of the set {1, 2, 4, 8, 16, 32, 64, 128, 256}. The search space range is 1 PRB in the frequency domain and, in the time domain, the maximum repetitions (Rmax=R4) configured by the base station; wherein, AL=1 repeating R2 and AL=2 repeating R1 are equivalent. Therefore AL=1 can be unsupported when the repetitions are greater than R1, or only support AL=1 in a non-repetitive mode; a few specific compositions of the search space are as follows (wherein R4≥8):

{L,R, candidate set number}=[{2,R1,8}, {2,R2,4}, {2,R3,2}, {2,R4,1}]

{L,R, candidate set number}=[{1,R1,8}, {1,R2,4}, {1,R3,2}, {1,R4,1}
{2,R1,8}, {2,R2,4}, {2,R3,2}, {2,R4,1}]
{L,R, candidate set number}=[{1,R1,8}
{2,R1,8}, {2,R2,4}, {2,R3,2}, {2,R4,1}]
{L,R, candidate set number}=[{1,1,8}
{2,R1,8}, {2,R2,4}, {2,R3,2}, {2,R4,1}]
{L,R, candidate set number}=[{1,1,2}
{2,R1,8}, {2,R2,4}, {2,R3,2}, {2,R4,1}]

Or, in order to take into account the terminal's blind detection complexity, restrict the repetitions to be a non-maximum repetition number based on the preceding, such as by configuring a specific candidate set number through RRC or SIB signaling; or, when AL=2, all candidate set quantities of R are uniformly 1; or impose restrictions on the candidate sets corresponding to the non-maximum R corresponding to AL=2 or AL=1, such as by having candidate set quantities greater than 1 when R is lesser than Rx, and candidate set quantities equal to 1 when R is greater than Rx.

A few specific compositions of the search space are as follows (wherein when AL1 has candidate set quantities greater than 1, optimally the frequency domain is first and the time domain comes after):

{L,R, candidate set number}=[{2,R1,4}, {2,R2,2}, {2,R3,1}, {2,R4,1}]

{L,R, candidate set number}=[{2,R1,8}, {2,R2,4}, {2,R3,1}, {2,R4,1}]

{L,R, candidate set number}=[{2,R1,8}, {2,R2,1}, {2,R3,1}, {2,R4,1}]

{L,R, candidate set number}=[{1,R1,8}, {1,R2,4}, {1,R3,2}, {1,R4,1}
{2,R1,1}, {2,R2,1}, {2,R3,1}, {2,R4,1}]
{L,R, candidate set number}=[{1,R1,8}, {1,R2,1}, {1,R3,1}, {1,R4,1}
{2,R1,8}, {2,R2,1}, {2,R3,1}, {2,R4,1}]
{L,R, candidate set number}=[{1,R1,8}, {1,R2,4}, {1,R3,1}, {1,R4,1}
{2,R1,8}, {2,R2,4}, {2,R3,1}, {2,R4,1}]
{L,R, candidate set number}=[{1,R1,4}, {1,R2,2}, {1,R3,1}, {1,R4,1}
{2,R1,2}, {2,R2,2}, {2,R3,1}, {2,R4,1}]
{L,R, candidate set number}=[{1,R1,2}, {1,R2,1}, {1,R3,1}, {1,R4,1}
{2,R1,1}, {2,R2,1}, {2,R3,1}, {2,R4,1}]
{L,R, candidate set number}=[{1,R1,2}, {1,R2,2}, {1,R3,2}, {1,R4,2}
{2,R1,1}, {2,R2,1}, {2,R3,1}, {2,R4,1}]
{L,R, candidate set number}=[{1,R1,1}, {1,R2,1}, {1,R3,1}, {1,R4,1}
{2,R1,1}, {2,R2,1}, {2,R3,1}, {2,R4,1}]
{L,R, candidate set number}=[{1,R1,8}
{2,R1,4}, {2,R2,2}, {2,R3,2}, {2,R4,1}]
{L,R, candidate set number}=[{1,R1,8}
{2,R1,1}, {2,R2,1}, {2,R3,1}, {2,R4,1}]
{L,R, candidate set number}=[{1,R1,2}
{2,R1,1}, {2,R2,1}, {2,R3,1}, {2,R4,1}]
{L,R, candidate set number}=[{1,1,8}
{2,R1,8}, {2,R2,4}, {2,R3,2}, {2,R4,1}]
{L,R, candidate set number}=[{1,1,8}
{2,R1,1}, {2,R2,1}, {2,R3,1}, {2,R4,1}]
{L,R, candidate set number}=[{1,1,2}
{2,R1,1}, {2,R2,1}, {2,R3,1}, {2,R4,1}]

It should be noted that the above uses R1-R4 as an example; it can also be other repetition types such as R1-R2, R1-R8, etc.

Specially, when Rmax is 1, 2, 4, or 8, which is used primarily for normal coverage scenarios, relatively more users require support; therefore the candidate sets ought to be as numerous as they can, such as by filling up, or filling up as much as possible, the available positions in the search space while not increasing the maximum blind detection frequency relative to the LTE system. The specific candidate set quantities are:

If Rmax=1, then the candidate set {L,R, candidate set number}=[{1,1,2}, {2,1,1}];

If Rmax=2, then the candidate set {L,R, candidate set number}=[{1,1,2}, {2,1,2}, {2,2,1}]; or [{1,1,4}, {2,1,2}, {2,2,1}]

If Rmax=4, then the candidate set {L,R, candidate set number}=[{1,1,2}, {2,1,4}, {2,2,2}, {2,4,1}1; or [{1,1,8}, {2,1,4}, {2,2,2}, {2,4,1}]; or [{1,1,8}, {2,1,4}, {2,2,1}, {2,4,1}]

If Rmax=8, then the candidate set {L,R, candidate set number}=[{1,1,2}, {2,1,8}, {2,2,4}, {2,4,2}, {2,8,1}]; or [{1,1,16}, {2,1,8}, {2,2,4}, {2,4,2}, {2,8,1}]; or [{1,1,16}, {2,1,8}, {2,2,1}, {2,4,1}, {2,8,1}]

Embodiment 1

Based on the scheduling window or the scheduling cycle, the value of k is implicitly determined by the Resource Allocation (RA).

The scheduling window size (window length) or the scheduling cycle size is T ms, wherein the value of T is fixed or configured by the base station; an optional T value is an integer multiple of the radio frame, such as T=k×10 ms; or the window length T=k×2.^x ms, x={0,1,2,3,5}, k=1,2, . . . , K. Preferably, K is an element from the set {1, 2, 4, 8, 16, 32, 64, 128} or the set {1, 2, 3, 4, 5, 6, 7, 8, 9, 10}, that is, an integer amount of uplink resource units can be included in the scheduling window; the uplink resource units are all 2.^x ms, and x is the set {0,1,2,3,5}; when determining the window length T, preferably x=5, k=1, and T=32. The preferable possible window length is at least one of the following set: {16, 32, 64, 128, 256, 512, 768, 1024, 1280, 1536, 1792, 2048}; when configured by the base station, the SIB message configures the same window length to be used in the cell, or the RRC message independently configures the window length for each UE in the cell.

In what follows the scheduling window is used as an illustrative example.

In the scheduling window, the search space where the downlink control channel is located is configured by the base station; different search spaces are concentrated in the first X subframes of the scheduling window; the corresponding PDSCH is located in the same scheduling window. Resource allocation type 2 or resource allocation 2 with continuous length restrictions (e.g., the PDSCH resource allocation wherein the continuous occupied subframes do not exceed 6 is allocated to the window length T=32 ms, wherein the resource allocation uses $\lceil \log_2(6N_{Rll}^{Window}-6) \rceil$ bits; when the window length $N_{Rll}^{Window}=32$, the resource allocation bit field is 8 bits) is used to implement any initial position and occupancy within the scheduling window. Presently, the resource allocation expresses the number and position of the occupied continuous subframes within the scheduling window in the time domain.

Presently, the scheduling gap (k) does not require indication, and is implicitly determined through PDS CH resource allocation within the window; that is, the initial subframe of the NB-PDSCH is the first subframe in the continuous subframes occupied by the NB-PDSCH and determined by resource allocation.

Figure 11:
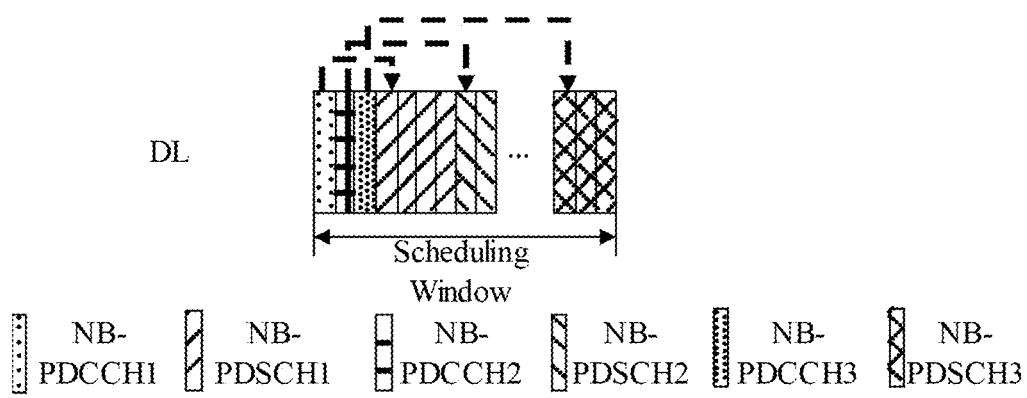
FIG. 11 is a schematic diagram of the scheduling gap being implicitly determined by the resource allocation within the scheduling cycle or the scheduling window based on the preferred embodiments of the present invention.

FIG. 11 is a schematic diagram of the scheduling gap being implicitly determined by the resource allocation within the scheduling cycle or the scheduling window based on the preferred embodiments of the present invention.

Advantages of the embodiment: the scheduling gap (k) can implement any value within the scheduling window length range without the need to singly indicate; utilizing the features of the resource allocation type 2, the position of the initial subframe and the subframe occupancy number are jointly coded, thereby reducing control signal expenditure.

Embodiment 2

Based on the scheduling window, the value of k is implicitly determined by the RA; it is possible that a TB block of the NB-PDSCH exceeds the window length.

With regard to the TB block of the downlink service exceeding the window length that may occur in Embodiment 1, for example, (1) T=the largest subframe occupied by the TB block, but since USS/CSS occupy the first X subframes, the allocated NB-PDSCH occupied subframes number exceeds the window length T. (2) Even if the configured T>the largest subframe occupied by the TB block, since the control channel repeat transmission, or two or more NB-PDSCHs are scheduled, the allocated NB-PDSCH occupied subframes number also exceeds the window length T.

Solutions comprise:

(1) Base station scheduling implementation, that is, the scheduled NB-PDSCH is only within the scheduling window range, and is scheduled flexibly based on the available resources. (The existing LTE system has the same problem, wherein TB blocks of different PDSCH are not always able to occupy the largest number of PRB, and the existing PRB number is insufficient for use.)

Figure 12:
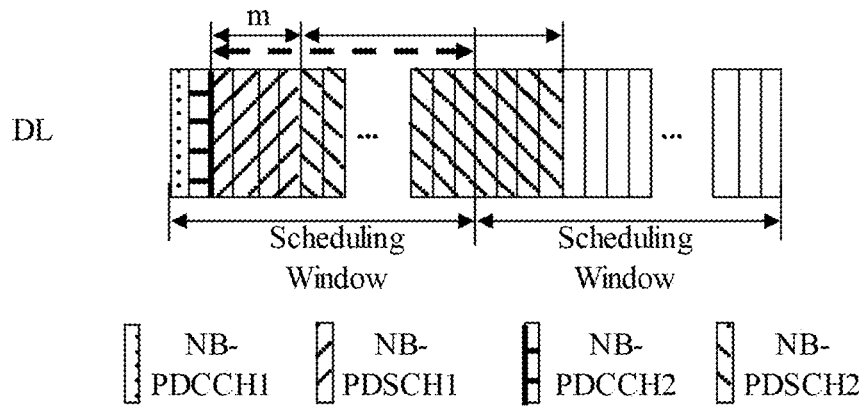
FIG. 12 is a schematic diagram of the scheduling gap being determined by the resource allocation within the scheduling cycle or the scheduling window, combined with a dynamic offset value, based on the preferred embodiments of the present invention.

(2) Indicate the scheduling window offset. When the scheduled NB-PDSCH in the scheduling window W(i) needs to use more subframes than are remaining in the scheduling window, the scheduled NB-PDSCH can be located in its present scheduling window as well as the following scheduling window through additional indication of the scheduling window offset value (m), that is, occupying successive scheduling windows. FIG. 12 is a schematic diagram of the scheduling gap being determined by the resource allocation within the scheduling cycle or the scheduling window, combined with a dynamic offset value, based on the preferred embodiments of the present invention; wherein the value of m is the initial position of RA+m subframes backward as the actual initial position; that is, in this case RA is still a resource allocation within the scheduling window range, but the result of the resource allocation can be shifted backwards by offset m subframes.

Advantages of the embodiment: similar to Embodiment 1, this case increases scheduling flexibility and reduces resource allocation restrictions within the window. What should be explained about the additional increased signal expenditure and offset value indication is that within a scheduling window, USS/CSS configuration is decided by the base station, and is not necessarily occupied starting from the first subframe in the scheduling window.

Embodiment 3

Without a scheduling window, and based on DCI dynamic indication; for coverage enhancement repeat transmissions, NB-PDCCH fills the subframe set or the PRB set of the search space, wherein k=1 is used, which can be a fixed scheduling gap.

For normal coverage, if the search space only supports 1 subframe, a maximum of 2 NB-PDCCH are supported. In this case, k is fixed (e.g., k=1), and one NB-PDCCH is wasted; or, NB-PDSCH supports resource units from 6 subcarriers, wherein k=1 and there is no waste of resources. There is, of course, 1 subframe occupied by 1 NB-PDCCH; k=1 scheduling an NB-PDSCH that occupies an entire PRB is also possible.

In addition, whether or not k is fixed, with the FDM multiplexing mode, the frequency domain indication specifically comprises two modes: one mode is implicit indication, that is, the the frequency domain subcarrier where the NB-PDSCH is located is positioned at the same subcarrier location as the scheduled NB-CCE; another mode directly indicates the frequency domain position through the bit field of the DCI.

For normal coverage, the most typical situation is that the search space supports multiple candidate sets; at the same time the smallest resource unit of the NB-PDSCH is 1 PRB. A fixed k creates control resource waste or NB-PDSCH collision. It is necessary to use a k that can change its values.

First, the base station configures the initial subframe of the search space where the NB-PDCCH is located; the terminal is able to detect its own NB-PDCCH in the corresponding search space according to the initial subframe of the search space. At the same time, it can determine the final subframe (n) of the NB-PDCCH. In this case, the initial subframe of the corresponding NB-PDSCH is n+k; since there is no scheduling window limitation on the resource allocation range, it is necessary to indicate the number of occupied subframes and the initial subframe of the NB-PDSCH.

Figure 13:
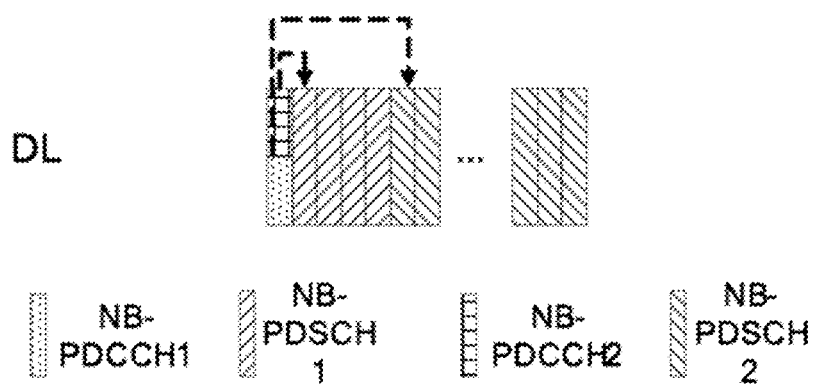
FIG. 13 is schematic diagram 1 of the scheduling gap being determined by the DCI dynamic indication based on the preferred embodiments of the present invention.

Second, after receiving the NB-PDCCH, the DCI is demodulated to obtain the scheduling gap (k) indication, that is, the scheduling gap is determined. FIG. 13 is schematic diagram 1 of the scheduling gap being determined by the DCI dynamic indication based on the preferred embodiments of the present invention.

Further, the value range for the value of k comprises one of the following:

(1) k is a continuous value, that is, the value range of k is k=0,1,2,3,4 . . . , K; in this case ensuring scheduling flexibility, the subframe number occupied by NB-PDSCH can be any value within k, but the control expenditure for indicating the scheduling gap (k) is relatively large, wherein, the k value requires a definite scheduling cycle limit; that is, similar to Embodiment 1, there needs to exist one scheduling cycle, wherein k is indicated within the scheduling cycle. k, for example, is at least one of the following set: {16, 32, 64, 128, 256, 512, 768, 1024, 1280, 1536, 1792, 2048};

(2) k is a non-continuous value, that is, the value range of k is (1) a subset, such as {1, 2, 4, 8, 16, 32, 64 . . . K} or {1, 2, 3, 5, 9, 17, 33 . . . K}; k implies the same as in above, ensuring a definite flexibility and reducing indication signaling expenditure at the same time. The subframe number occupied by the NB-PDSCH depends on the base station schedule. For example, the NB-PDSCH value set is continuous values, such as {1, 2, 3, 4, 5, 6}; or, restrictions on the NB-PDSCH occupied subframes are imposed to save as many resources as possible; that is, the continuous subframe number occupied by 1 TB block of the NB-PDSCH can also be a non-continuous value set, such as {1, 2, 4, 8, 16, 32}; that is, the scheduling gap (k) value set and the possible resource allocation size for the NB-PDSCH are mutually restricted, wherein the maximum value of the k value set also requires a definite scheduling cycle limit, that is, similar to Embodiment 1, there needs to exist one scheduling cycle, wherein k is indicated within the scheduling cycle;

(3) k is a non-continuous value, that is, the value range of k is (1) a subset, such as {1, 2, 4, 8, 16, 32, 64 . . . K} or {1, 2, 3, 5, 9, 17, 33 . . . K}; k implies the same as in above, and considering that the position of the final subframe of the NB-PDCCH is located anywhere within the search space, in order not to limit the value set when indicating the initial subframe of the NB-PDSCH, a second indication is implemented, indicating the corresponding offset value, such as a k2 value set as {0,1,2,3} or {0,1,2,3,4,5,6,7}, so that the NB-PDSCH value set is continuous values.

After determining the scheduling gap based on the dynamic indication, X bit indication of the subframe number occupied by the PDSCH is still required, such as using 3 bit for indicating the PDSCH to occupy continuous subframes not exceeding 6/PRB resource allocation.

Characteristics of the embodiment: the DCI directly indicates the scheduling gap (k) and the NB-PDSCH occupied subframes. Since the NB-PDSCH occupied subframes number is any value of continuous subframes not exceeding N subframes (e.g, N=6 or 10), when any k value is required, the control signal expenditure is relatively large. Restricting a certain k value set also restricts the resource allocation of the NB-PDSCH; otherwise, a certain amount of waste or a second timing indication is permissible to ensure that NB-PDSCH resource allocation can use any value of continuous subframes not exceeding N.

Embodiment 4

Without a scheduling window, based on DCI dynamic indication, while limiting the final subframe (n) of the NB-PDCCH.

In this case, n is the final subframe of the search space.

Or, n is the final subframe of the control region (containing multiple search spaces).

For implementing the k value in situation (2) of Embodiment 3, since the restricted set k is used for scheduling, if the initial subframe n+k of the NB-PDSCH is determined according to the final subframe of the NB-PDDCH, the initial subframes in the time domain determined by n+k are different since final n of different NB-PDCCH in the USS are different, wherein the subframe number occupied by the NB-PDSCH could no longer be a non-continuous k value set.

As FIG. 13 shows, the NB-PDSCH occupied subframes still maintain a limited value set, which causes the k value range to exceed the limited set. (Another possibility is that the k value is still a limited value set, and the NB-PDSCH occupied subframes exceed the limited set.)

Since the indication signaling is limited, k indication is necessarily implemented within a limited value set. Since any value within the search space can be the n subframes, the k value finally ends up not belonging to a limited set (whether or not the NB-PDSCH occupied subframes belong to a limited set); therefore, the solutions are as follows:

(1) Define the search space as containing only 1 subframe. In this case the final subframe (n) of the NB-PDCCH is singly determined; the scheduling gap (k) and the NB-PDSCH occupied subframes all can be a limited set, saving control signal expenditure.

(2) Define the search space as {2, 4, 8} or Rmax subframes (the maximum repetitions in the downlink control channel of the search space configured by the SIB or the RRC for the base station is the Rmax), the scheduling gap is determined based on the final subframe n of the USS, wherein the NB-PDSCH initial subframe is n+k, which can ensure the scheduling gap (k) and the NB-PDSCH occupied subframes all belong to a limited set, thereby saving control signal expenditure.

Characteristics of the embodiment: similar to Embodiment 3, aligning n subframes of the different NB-PDSCH ensures that the scheduling gap (k) and the NB-PDSCH occupied subframes all belong to a limited set, thereby saving control signal expenditure.

Embodiment 5

Without a scheduling window and a fixed scheduling gap, using multiple NarrowBands. Or, without a scheduling window, and dynamic indication of the scheduling gap, using multiple NarrowBands.

Figure 14:
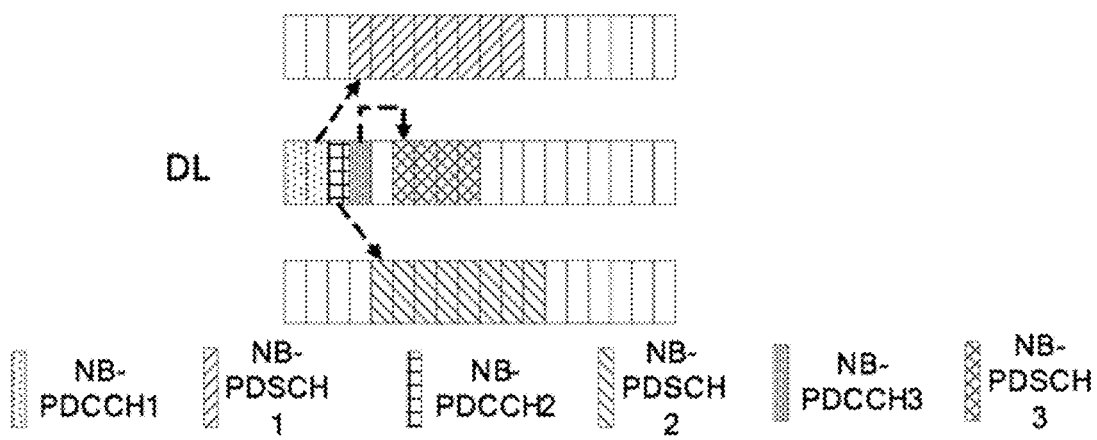
FIG. 14 is a schematic diagram of determining the scheduling gap with fixed values when using multiple NarrowBands based on the preferred embodiments of the present invention.

The search space supports multiple candidate sets, and the smallest resource unit of the NB-PDSCH is 1 PRB, using a fixed scheduling gap (k), such as k=2. FIG. 14 is a schematic diagram of determining the scheduling gap with fixed values when using multiple NarrowBands based on the preferred embodiments of the present invention.

First, the base station configures the NarrowBand position and the initial subframe of the search space where the NB-PDCCH is located; the terminal is able to determine the final subframe (n) of the NB-PDCCH based on detecting its own NB-PDCCH in the search space. In this case, the initial subframe of the corresponding NB-PDSCH is n+k.

Second, after receiving the NB-PDCCH, the DCI is demodulated to determine the initial subframe of the NB-PDSCH based on the fixed scheduling gap, the NB-PDSCH is received based on the PRB NarrowBand position indicated by the DCI and the number of subframes occupied.

In addition, the scheduling gap (k) can be notified by the DCI, which increases scheduling flexibility and facilitates resource alignment in different NarrowBands. The value of k is the same as in Embodiment 3.

In implementing the present embodiment, whereby a fixed scheduling gap can be achieved through scheduling multiple NarrowBands, dynamic notification of the scheduling gap is avoided. Requiring additional indication of the NarrowBand position where the NB-PDSCH is located is also possible. In addition, using the DCI to dynamically notify the NB-PDSCH initial subframe position can both increase the flexibility of scheduling and facilitate resource alignment of each NarrowBand.

Embodiment 6

Without a scheduling window, the scheduling gap is implicitly determined, and multiple NarrowBands are used.

Figure 15:
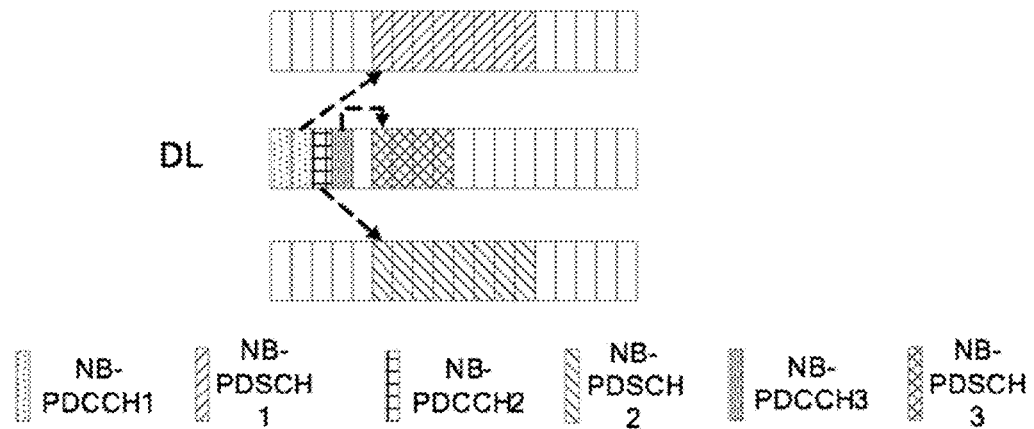
FIG. 15 is a schematic diagram of determining the scheduling gap with the final subframe fixed offset value of the search space where the NB-PDCCH is located when multiple NarrowBands are used based on the preferred embodiments of the present invention.

The search space supports multiple candidate sets, and the smallest resource unit of the NB-PDSCH is 1 PRB; the scheduling gap (k) is implicitly determined; the initial subframe n+k of the NB-PDSCH is determined based on the final subframe (n) of the search space where the NB-PDCCH is located, and k is a fixed value, such as k=2. FIG. 15 is a schematic diagram of determining the scheduling gap with the final subframe fixed offset value of the search space where the NB-PDCCH is located when multiple NarrowBands are used based on the preferred embodiments of the present invention.

First, the base station configures the NarrowBand position and the initial subframe of the search space where the NB-PDCCH is located, the terminal detects its own NB-PDCCH in the search space, and the final subframe (n) in the search space is determined based on the search space configured by the base station. In this case, the initial subframe of the corresponding NB-PDSCH is n+k.

Next, after receiving the NB-PDCCH, the DCI is demodulated to determine the initial subframe of the NB-PDSCH based on the scheduling gap implicitly determined, and the NB-PDSCH is received based on the PRB NarrowBand position indicated by the DCI and the occupied subframe number.

In implementing the present embodiment, whereby a fixed scheduling gap can be achieved through scheduling multiple NarrowBands, dynamic notification of the scheduling gap is avoided. Requiring additional indication of the NarrowBand position where the NB-PDSCH is located is also possible. Compared with Embodiment 5, the present embodiment facilitates alignment of occupied resources in the time domain in each channel; each channel occupies subframe lengths using a power of two.

Embodiments 7-9 are the methods for determining the uplink scheduling gap.

Embodiment 7

Based on the scheduling window or the scheduling cycle, the value of k is implicitly determined by the RA.

The scheduling window or the scheduling cycle are the same as in Embodiment 1.

In the scheduling window, the search space where the downlink control channel is located is configured by the base station, and different search spaces are concentrated in the first X subframes of the scheduling window. The NB-PUSCH corresponding to the scheduling is located in the following scheduling window; using resource allocation type 2 or resource allocation type 2 with continuous length restriction (e.g, the PDSCH resource allocation wherein the continuous occupied subframes do not exceed 6 is allocated to the window length T=32 ms, wherein the resource allocation uses $\lceil \log_2(6N_{KII}^{Window}-6) \rceil$ bits; when the window length $N_{KII}^{Window}=32$, the resource allocation bit field is 8 bits) to achieve an RU integer multiple of the initial position and occupancy within the scheduling window. Presently, the resource allocation expresses the continuous subframe number and frequency domain position within the scheduling window in the time domain.

Figure 16:
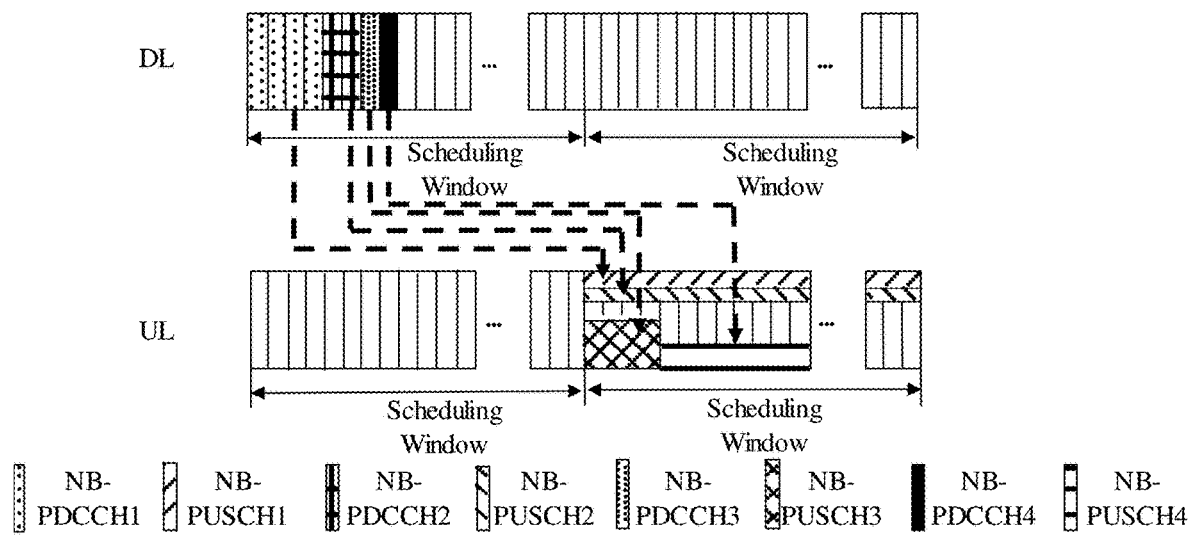
FIG. 16 is a schematic diagram of implicitly determining the scheduling gap with the resource allocation within the scheduling cycle or the scheduling window based on the preferred embodiments of the present invention.

In this case, the scheduling gap (k) does not require indication, and is implicitly determined through NB-PUSCH resource allocation in the window. FIG. 16 is a schematic diagram of implicitly determining the scheduling gap with the resource allocation within the scheduling cycle or the scheduling window based on the preferred embodiments of the present invention, that is, the initial subframe of the NB-PUSCH is the first subframe of the continuous subframes occupied by the NB-PUSCH as determined by resource allocation.

Similar to Embodiment 2, considering that the offset schedules the NB-PUSCH to occupy the resource of the next scheduling window; or the resource allocation can occupy multiple scheduling windows.

Advantages of the embodiment: scheduling gap (k) can implement any value within the scheduling window length range. Without the need to singularly indicate, but using resource allocation, the position of the initial subframe and the subframe occupancy number are jointly coded, thereby reducing control signal expenditure.

Embodiment 8

Without a scheduling window, and based on DCI dynamic indication.

For notmal coverage, wherein the most typical situation is that the search space supports multiple candidate sets, and the NB-PUSCH supports subcarrier level scheduling. A fixed k creates control resource waste or NB-PDSCH collision. It is necessary to use a k that can change its values.

First, the base station configures the initial subframe of the search space where the NB-PDCCH is located, and the terminal is able to detect its own NB-PDCCH in the corresponding search space according to the initial subframe of the search space. At the same time, it can determine the final subframe (n) of the NB-PDCCH. In this case the corresponding initial subframe of the NB-PUSCH is n+k. Since there is no scheduling window limitation on the resource allocation range, the initial subframe of the NB-PUSCH, the number of occupied subframes, and the frequency domain position need to be indicated.

Figure 17:
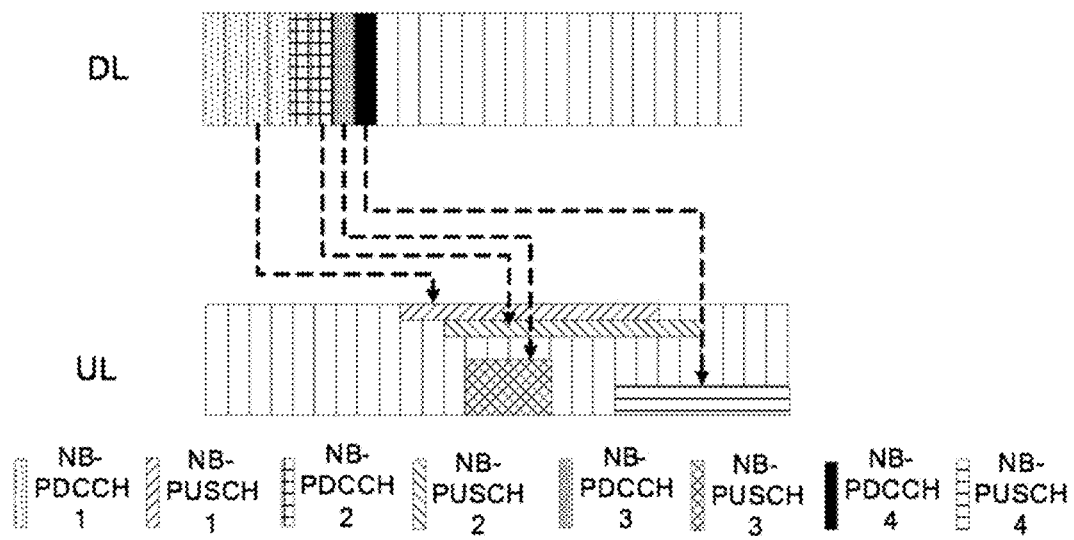
FIG. 17 is schematic diagram 2 of the scheduling gap being determined by the DCI dynamic indication based on the preferred embodiments of the present invention.

Next, after receiving the NB-PDCCH, the DCI is demodulated to obtain the scheduling gap (k) indication, that is, the scheduling gap is determined. FIG. 17 is schematic diagram 2 of the scheduling gap being determined by the DCI dynamic indication based on the preferred embodiments of the present invention.

Further, the value range for the k value comprises one of the following:

(1) k is a continuous value, that is, the value range of k is k=0,1,2,3,4 . . . , K. in this case ensuring scheduling flexibility, the number of subframes occupied by the NB-PUSCH can be any value within k. But the control expenditure for indicating the scheduling gap (k) is relatively large, wherein the k value requires a definite scheduling restriction, that is, similar to Embodiment 1, there needs to exist one scheduling cycle, wherein k is indicated within the scheduling cycle. For example, k is at least one of the following set: {16, 32, 64, 128, 256, 512, 768, 1024, 1280, 1536, 1792, 2048}.

(2) k is a non-continuous value, that is, the value range of k is (1) a subset, such as {1, 2, 4, 8, 16, 32, 64 . . . K}, or {1, 2, 3, 5, 9, 17, 33 . . . K}; k implies the same as in above, ensuring a definite flexibility and reducing indication signaling expenditure at the same time. Relatedly, since the k value is non-continuous, the NB-PDSCH occupied subframes are, in reality, restricted; that is, the continuous subframe number occupied by 1 TB block of the NB-PUSCH is a non-continuous value set, such as {1, 2, 4, 8, 16, 32}; that is, the scheduling gap (k) value set and the possible resource allocation size for the NB-PDSCH are mutually restricted.

(3) k is a non-continuous value, that is, the value range of k is (1) a subset, such as {1, 2, 4, 8, 16, 32, 64 . . . K}, or {1, 2, 3, 5, 9, 17, 33 . . . K}; k implies the same as in above, ensuring a definite flexibility and reducing indication signaling expenditure. Relatedly, since the k value is non-continuous, the NB-PDSCH occupied subframes are, in reality, restricted; that is, the continuous subframe number occupied by 1 TB block of the NB-PDSCH can also be a non-continuous value set, such as {1, 2, 4, 8, 16, 32}, and considering that the position of the final subframe of the NB-PDCCH is located at any position within the search space, in order not to limit the value set when indicating the initial subframe of the NB-PDSCH, a second indication is implemented; for example, a k2 value set as {0,1,2,3} or {0,1,2,3,4,5,6,7}, causing the NB-PUSCH value set to be continuous values.

After determining the scheduling gap based on the dynamic indication, X bit indication of the subframe number occupied by the PDSCH is still required, such as using 3 bit for indicating the PDSCH to occupy continuous subframes not exceeding 6/PRB resource allocation.

In addition, all of the subframes (n) used for determining the scheduling gap can also be the last subframe of the search space.

Characteristics of the embodiment: the scheduling gap (k) and the number of subframes occupied by the NB-PUSCH are directly indicated by the DCI; when any k value is required, the control signal expenditure is relatively large. Aligning n subframes of different NB-PDSCH ensures that the scheduling gap (k) and the NB-PDSCH occupied subframes all belong to a limited set, thereby saving control signal expenditure.

Embodiment 9

Without a scheduling window, the scheduling gap takes a fixed value based on the final subframe of the NB-PDCCH, and multiple NarrowBands are used.

Without a scheduling window, the scheduling gap is implicitly determined, taking a fixed value based on the final subframe of the search space where the NB-PDCCH is located, and multiple NarrowBands are used.

Without a scheduling window, the scheduling gap is indicated by the DCI, and multiple NarrowBands are used.

Figure 18:
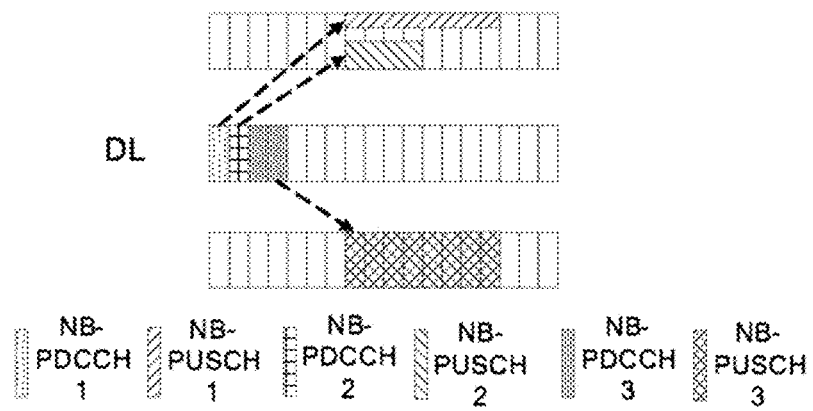
FIG. 18 is a schematic diagram of determining the scheduling gap based on the final subframe fixed value of the search space where the NB-PDCCH is located or with the DCI dynamic indication based on the preferred embodiments of the present invention.

The search space supports multiple candidate sets, and the NB-PUSCH supports subcarrier level scheduling; the scheduling gap (k) is implicitly determined or indicated by the DCI.

Wherein the methods for implicit determination comprise: determining the initial subframe of the NB-PUSCH n+k based on the final subframe of the NB-PDCCH (n), wherein k is a fixed value, such as k=4; determining the initial subframe of the NB-PUSCH n+k based on the final subframe (n) of the search space where the NB-PDCCH is located, wherein k is a fixed value, such as k=4. FIG. 18 is a schematic diagram of determining the scheduling gap with the final subframe fixed value of the search space where the NB-PDCCH is located or with the DCI dynamic indication based on the preferred embodiments of the present invention.

Wherein configuration by the DCI comprises: the scheduling gap determining the initial subframe of the NB-PUSCH n+k based on the final subframe of the NB-PDCCH (n), wherein k is indicated by the DCI, a non-fixed value belonging to a value set, as is shown in FIG. 18.

First, the base station configures the NarrowBand position and the initial subframe of the search space where the NB-PDCCH is located, the terminal detects its own NB-PDCCH in the search space (1) based on the final subframe (n) of the NB-PDCCH, wherein the corresponding initial subframe of the NB-PUSCH is n+k and k is a fixed value; (2) based on the final subframe (n) of the search space configured by the base station; in this case the corresponding initial subframe of the NB-PUSCH is n+k, and k is a fixed value; (3) determining the scheduling gap (k) based on the bit field of the DCI.

Next, after receiving the NB-PDCCH, the DCI is demodulated based on (1) fixed; (2) implicit determination; or (3) dynamic indication of the bit field in the DCI; the scheduling gap is determined, the initial subframe of the NB-PUSCH is determined, and the NB-PUSCH is received based on the PRB NarrowBand position indicated by the DCI, the number of occupied subframes, and the frequency domain position.

With the present embodiment, fixed or variable scheduling gaps can be achieved through scheduling multiple NarrowBands, thereby avoiding dynamically notifying scheduling gaps or dynamically notifying flexible scheduling to ensure resource alignment. Requiring additional indication of the NarrowBand position where the NB-PDSCH is located is also possible. Each channel occupies a subframe length using a power of 2.

With the descriptions of the methods of the above embodiments, those skilled in the related art can clearly understand that the methods based on the foregoing embodiments can be implemented with software and the required universal hardware platform. Of course, these methods can also be implemented with only hardware, but for many situations the former is a better method. Based on this understanding, the nature of the technical solutions of the present invention, or the portion of which that contributes to existing technologies, can take the form of computer software products, which can be stored on a storage medium (e.g, ROM/RAM, magnetic or optical disk), comprising several instructions that make a terminal device (e.g, a cell phone, computer, server, or network equipment, etc.) execute the methods of each embodiment of the present disclosure.

It should be noted that the modules mentioned above can be implemented with software or hardware; the latter can be achieved with, but not limited by, the following methods: modules located in the same processor; or, modules separated across multiple processors.

The embodiments of the present invention further provide a storage medium. Optionally, within the present embodiment, the storage medium can be configured to store program code used to execute the following steps:

S1, demodulating the NarrowBand Physical Downlink Control Channel (NB-PDCCH);

S2, determining the initial subframe of the NarrowBand Physical Uplink Shared Channel (NB-PUSCH) or the NarrowBand (Physical) Downlink Shared Channel (NB-PDSCH) through NB-PDCCH demodulation, and using the initial subframe as the starting point for the scheduling gap, wherein, the basis for determining the initial subframe comprises at least one of the following: the final subframe of the NB-PDCCH, the final subframe of the search space where the NB-PDCCH is located, resource allocation within the scheduling window, and the scheduling gap indication.

Optionally, within the present embodiment, the storage medium can comprise, but is not limited to, any type of medium that can store program code, such as USB, Read-Only Memory (ROM), Random Access Memory (RAM), portable hard drives, magnetic or optical disks, etc.

Optionally, within the present embodiment, the processor executes the steps of the methods of the foregoing embodiments based on the stored program code of the storage medium.

Optionally, for the specifics of the present embodiment, one can reference the illustrative descriptions of the foregoing and optional embodiments, which will not be discussed further here.

Those skilled in the related art should understand that each module or step of the present invention can use a common computer apparatus for implementation, and can be concentrated on one computer apparatus or distributed across a network of multiple computer apparatus; optionally, they can use computer-executable program code for implementation, and thus can be stored on a medium and executed by a computing apparatus. Under some circumstances, the steps may be executed in a different order than has been described herein, or can be separated to form an integrated circuit module for each, or multiple modules or steps can be made into a single integrated circuit module for implementation. In this way, the present invention is not limited to any particular combination of hardware and software.

The preceding is only the preferred embodiments of the present invention, and does not serve to limit its claims. It will be apparent to those skilled in the related art that the present invention may undergo any type of change or alternation that should fall within the spirit and scope of the present invention. Any modification, equivalent replacement, improvement, etc, falls within the protection of the present disclosure.

INDUSTRIAL APPLICABILITY

The technical solutions provided by the embodiments of the present invention can be applied to the process of determining the scheduling gap, wherein the NarrowBand Physical Downlink Control Channel (NB-PDCCH) is demodulated in order to determine the initial subframe of the scheduled NarrowBand Downlink Shared Channel (NB-PDSCH) or the NarrowBand Physical Uplink Shared Channel (NB-PUSCH), wherein, the basis for determining the initial subframe comprises at least one of the following: the final subframe of the NB-PDCCH, the final subframe in the search space where the NB-PDCCH is located, the resource allocation within the scheduling window, and the scheduling gap indication; the implementation of the present embodiments resolves the problem of how to determine scheduling in the NarrowBand system, thereby saving indication expenditure and increasing resource usage efficiency, as well as solving the problem of resource waste caused by resource inequality resulting from fixed time gaps, which solves the problem of continuous transmission traffic.

The invention claimed is:

1. A method performed by a wireless communication device, comprising:
   demodulating a NarrowBand Physical Downlink Control Channel (NB-PDCCH) received from a wireless communication node; and
   determining an initial subframe of a NarrowBand Downlink Shared Channel (NB-PDSCH) according to a final subframe of the NB-PDCCH and a scheduling gap indication with a first value set,
   wherein the scheduling gap indication indicates a number of subframes between the final subframe of the NB-PDCCH and the initial subframe of the NB-PDSCH, and the first value set is a finite set comprising predefined non-continuous values,
   wherein the first value set further comprises a first subset and a second subset corresponding to a number of maximum repetition (Rmax) being greater than or equal to a predefined threshold value and less than the predefined threshold value, respectively,
   wherein Rmax is configured by high-layer signaling,
   wherein the first value set comprises values that indicate a number of available subframes and equal to $2^x$, wherein x={0, 1, 2, . . . 20},
   wherein an initial subframe of a NB-PDCCH search space is configured according to at least one of the following parameters: an offset, the number of maximum repetition (Rmax) and a scheduling window length T, and
   wherein the initial subframe of a NB-PDCCH search space minus the offset is an integer multiple of the scheduling window length T, wherein the offset is smaller than or equal to the scheduling window length T.

2. The method of claim 1, wherein the first subset comprises values that are multiples of Rmax/i and the second subset comprises no values that are multiples of Rmax/i, wherein i is a positive integer.

3. The method of claim 1, wherein the first value set further comprises a value equaling to $k \times 2^x$, wherein k is a non-negative integer.

4. A method performed by a wireless communication node, comprising:

transmitting a NarrowBand Physical Downlink Control Channel (NB-PDCCH) to a wireless communication device, wherein a final subframe of the NB-PDCCH and a scheduling gap indication with a first value set indicates an initial subframe of a NarrowBand Downlink Shared Channel (NB-PDSCH), and wherein the scheduling gap indication indicates a number of subframes between the final subframe of the NB-PDCCH and the initial subframe of the NB-PDSCH, and the first value set is a finite set comprising predefined non-continuous values, wherein the first value set further comprises a first subset and a second subset corresponding to a number of maximum repetition (Rmax) being greater than or equal to a predefined threshold value and less than the predefined threshold value, respectively, wherein Rmax is configured by high-layer signaling, and wherein the first value set comprises values that indicate a number of available subframes and equal to $2^x$, wherein x={0, 1, 2, . . . 20}, wherein an initial subframe of a NB-PDCCH search space is configured according to at least one of the following parameters: an offset, the number of maximum repetition (Rmax) and a scheduling window length T, and wherein the initial subframe of a NB-PDCCH search space minus the offset is an integer multiple of the scheduling window length T, wherein the offset is smaller than or equal to the scheduling window length T.

5. The method of claim 4, wherein the first subset comprises values that are multiples of Rmax/i and the second subset comprises no values that are multiples of Rmax/i, wherein i is a positive integer.

6. The method of claim 4, wherein the first value set further comprises a value equaling to $k \times 2^x$, wherein k is a non-negative integer.

7. A wireless communication device, comprising:
a receiver for receiving a NarrowBand Physical Downlink Control Channel (NB-PDCCH) from a wireless communication node; and
at least one processor configured to:
demodulate the NB-PDCCH;
determining an initial subframe of a NarrowBand Downlink Shared Channel (NB-PDSCH) according to a final subframe of the NB-PDCCH and a scheduling gap indication with a first value set,
wherein the scheduling gap indication indicates a number of subframes between the final subframe of the NB-PDCCH and the initial subframe of the NB-PDSCH, and the first value set is a finite set comprising predefined non-continuous values,
wherein the first value set further comprises a first subset and a second subset corresponding to a number of maximum repetition (Rmax) being greater than or equal to a predefined threshold value and less than the predefined threshold value, respectively,
wherein Rmax is configured by high-layer signaling, wherein the first value set comprises values that indicate a number of available subframes and equal to $2^x$, wherein x={0, 1, 2, . . . 20}, wherein an initial subframe of a NB-PDCCH search space is configured according to at least one of the following parameters: an offset, the number of maximum repetition (Rmax) and a scheduling window length T, and wherein the initial subframe of a NB-PDCCH search space minus the offset is an integer multiple of the scheduling window length T, wherein the offset is smaller than or equal to the scheduling window length T.

8. The wireless communication device of claim 7, wherein the first subset comprises values that are multiples of Rmax/i and the second subset comprises no values that are multiples of Rmax/i, wherein i is a positive integer.

9. The wireless communication device of claim 7, wherein the first value set further comprises a value equaling to $k \times 2^x$, wherein k is a non-negative integer.

10. A wireless communication node, comprising:
a transmitter for transmitting a NarrowBand Physical Downlink Control Channel (NB-PDCCH) to a wireless communication device,
wherein a final subframe of the NB-PDCCH and a scheduling gap indication with a first value set indicates an initial subframe of a NarrowBand Downlink Shared Channel (NB-PDSCH), and
wherein the scheduling gap indication indicates a number of subframes between the final subframe of the NB-PDCCH and the initial subframe of the NB-PDSCH, and the first value set is a finite set comprising predefined non-continuous values,
wherein the first value set further comprises a first subset and a second subset corresponding to a number of maximum repetition (Rmax) being greater than or equal to a predefined threshold value and less than the predefined threshold value, respectively,
wherein Rmax is configured by high-layer signaling, and
wherein the first value set comprises values that indicate a number of available subframes and equal to $2^x$, wherein x={0, 1, 2, . . . 20},
wherein an initial subframe of a NB-PDCCH search space is configured according to at least one of the following parameters: an offset, the number of maximum repetition (Rmax) and a scheduling window length T, and
wherein the initial subframe of a NB-PDCCH search space minus the offset is an integer multiple of the scheduling window length T, wherein the offset is smaller than or equal to the scheduling window length T.

11. The wireless communication node of claim 10, wherein the first subset comprises values that are multiples of Rmax/i and the second subset comprises no values that are multiples of Rmax/i, wherein i is a positive integer.

12. The wireless communication node of claim 10, wherein the first value set further comprises a value equaling to $k \times 2^x$, wherein k is a non-negative integer.

* * * * *

UNITED STATES PATENT AND TRADEMARK OFFICE
CERTIFICATE OF CORRECTION

PATENT NO. : 10,849,144 B2
APPLICATION NO. : 16/074061
DATED : November 24, 2020
INVENTOR(S) : Jing Shi et al.

Page 1 of 1

It is certified that error appears in the above-identified patent and that said Letters Patent is hereby corrected as shown below:

In the Claims

Claim 7, Column 35, Line 46, delete "determining" and insert --determine--

Signed and Sealed this
Fifth Day of December, 2023

Katherine Kelly Vidal
*Director of the United States Patent and Trademark Office*